(12) United States Patent
Nishida et al.

(10) Patent No.: US 9,025,612 B2
(45) Date of Patent: May 5, 2015

(54) MULTICASTING USING PEER-TO-PEER AND CLIENT-SERVER TRANSMISSION MODES

(71) Applicants: Makoto Nishida, Nagoya (JP); Yasuhiro Kudo, San Diego, CA (US)

(72) Inventors: Makoto Nishida, Nagoya (JP); Yasuhiro Kudo, San Diego, CA (US)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 62 days.

(21) Appl. No.: 13/726,933

(22) Filed: Dec. 26, 2012

(65) Prior Publication Data
US 2013/0170500 A1     Jul. 4, 2013

(30) Foreign Application Priority Data
Dec. 28, 2011    (JP) ................................ 2011-287663

(51) Int. Cl.
*H04L 12/66*     (2006.01)
*G06F 15/16*     (2006.01)
(Continued)

(52) U.S. Cl.
CPC ............ *H04L 12/66* (2013.01); *H04L 67/1091* (2013.01); *H04L 67/1074* (2013.01); *H04L 61/2589* (2013.01); *H04L 61/2514* (2013.01)

(58) Field of Classification Search
CPC ...................................................... H04L 12/66
USPC ..................................... 370/401; 709/22, 227
See application file for complete search history.

(56) References Cited

U.S. PATENT DOCUMENTS

| 7,644,173 B1* | 1/2010 | Zhang ........................... 709/231 |
| 2006/0212576 A1 | 9/2006 | Barkley et al. |
| 2007/0097989 A1 | 5/2007 | Sato |

(Continued)

FOREIGN PATENT DOCUMENTS

| JP | 2003-258836 A | 9/2003 |
| JP | 2006-262466 A | 9/2006 |

(Continued)

OTHER PUBLICATIONS

Azer Bestavros, "WWW Traffic Reduction and Load Balancing through Server-Based Caching", Mar. 1997, IEEE Concurrency, pp. 56-67.*

(Continued)

*Primary Examiner* — Chi H Pham
*Assistant Examiner* — Shailendra Kumar
(74) *Attorney, Agent, or Firm* — Banner & Witcoff, Ltd.

(57) ABSTRACT

A system includes a communication control device, a first communication device and a second communication device. The communication control device acquires first network information that identifies a first internal network to which the first communication device is connected, and second network information that identifies a second internal network. The communication control device decides a first method based on the acquired information. The first method indicates a method of transmission from the first communication device to the second communication device, and of transmission from the second communication device to the first communication device. The communication control device transmits information indicating the first method to the first communication device and the second communication device. The first communication device and the second communication device mutually communicate using the first method, based on the received information indicating the first method.

14 Claims, 15 Drawing Sheets

(51) Int. Cl.
*H04L 29/12* (2006.01)
*H04L 29/08* (2006.01)

(56) References Cited

U.S. PATENT DOCUMENTS

2011/0252145 A1* 10/2011 Lampell et al. ............... 709/227
2011/0252146 A1* 10/2011 Santamaria et al. .......... 709/227

FOREIGN PATENT DOCUMENTS

JP 2007-124486 5/2007
JP 2010-283762 A 12/2010

OTHER PUBLICATIONS

Dec. 24, 2014—(JP) Notification of Rejection—App 2011287663.

* cited by examiner

FIG. 5

| ID | GLOBAL IP ADDRESS | LOCAL IP ADDRESS | LOCAL NW ADDRESS |
|----|-------------------|------------------|------------------|
| 11 | 1.1.1.1 | 192.168.0.1 | 192.168.0.0 |
| 12 | 2.2.2.2 | 172.16.0.1 | 172.16.0.0 |
| 13 | 2.2.2.2 | 172.16.0.2 | 172.16.0.0 |

|  |  | TRANSMISSION DESTINATION | | | 242 |
|---|---|---|---|---|---|
|  |  | 11 | 12 | 13 |  |
| TRANSMISSION SOURCE | 11 |  | C/S | C/S |  |
|  | 12 | P2P |  | — |  |
|  | 13 | P2P | — |  |  |

FIG. 9

| | | TRANSMISSION DESTINATION | | | 242 |
| --- | --- | --- | --- | --- | --- |
| | | 11 | 12 | 13 | |
| TRANSMISSION SOURCE | 11 | | C/S | C/S | |
| | 12 | P2P | | P2P | |
| | 13 | P2P | P2P | | |

MULTICASTING USING PEER-TO-PEER AND CLIENT-SERVER TRANSMISSION MODES

CROSS-REFERENCE TO RELATED APPLICATION

This application claims priority to Japanese Patent Application No. 2011-287663, filed Dec. 28, 2011, the content of which is hereby incorporated herein by reference in its entirety.

BACKGROUND

The present disclosure relates to a system and a non-transitory computer-readable medium.

A communication method between a client and a server (hereafter client-server communication method), a peer to peer (P2P) communication method and the like are known as communication methods via a network. For example, in the client-server communication method, since a server inevitably receives requests from clients, the server enable to appropriately start communication between the clients. However, this communication method would increases communication to the server, communication reliability may deteriorate. On the other hand, for example, in the P2P communication method, it may be possible to construct a network with a low cost and it may also be possible to suppress the concentration of communication to the server. However, since all clients need to respond to requests from other clients, a processing load on the clients may increase.

For example, a technology is known that switches between the client-server communication method and the P2P communication method. By using this technology, it may be possible to reduce the processing load on the clients while suppressing the concentration of communication to the server and maintaining communication reliability.

SUMMARY

When a relay device, such as a gateway, is located between the server and the clients in the network, there is a possibility that communication between the clients and the server and communication between the client and the client are concentrated on the relay device. In the known technology, the communication method can be switched depending on whether P2P communication is possible or not. Therefore, it may be impossible to suppress the concentration of communication to the relay device. For that reason, there is a possibility that communication reliability deteriorates due to the concentration of communication to the relay device.

Embodiments of the broad principles derived herein provide a system and a non-transitory computer-readable medium that may suppress concentration of communication to a relay device by appropriately switching a communication method.

Embodiments provide a system includes a communication control device, a first communication device, and a second communication device. The communication control device is configured to be connectable to an external network. The first communication device configured to be connectable to a first internal network. The first internal network is connected to the external network. The second communication device is configured to be connectable to a second internal network. The second internal network is connected to the external network. The communication control device includes a processor and a memory. The memory storing computer-readable instructions, the computer-readable instructions, when executed by the processor of the communication control device, causing the communication control device to perform operations including acquiring first network information that identifies the first internal network, and second network information that identifies the second internal network, deciding a first method based on the first network information and the second network information, and first sending information indicating the first method to the first communication device and the second communication device. The first method indicating a method of transmission from the first communication device to the second communication device, and of transmission from the second communication device to the first communication device. The first communication device includes a processor and a memory. The memory storing computer-readable instructions, the computer-readable instructions, when executed by the processor of the first communication device, causing the first communication device to perform operations including second sending the first network information to the communication control device, first receiving the information indicating the first method from the communication control device, and first communicating with the second communication device using the first method, based on the received information indicating the first method. The second communication device includes a processor and a memory. The memory storing computer-readable instructions, the computer-readable instructions, when executed by the processor of the second communication device, causing the second communication device to perform operations including third sending the second network information to the communication control device, second receiving the information indicating the first method from the communication control device, and second communicating with the first communication device using the first method, based on the received information indicating the first method.

Embodiments also provide a non-transitory computer-readable medium storing computer-readable instructions that, when executed by a processor of a communication control device connectable to an external network, cause the processor to perform the steps of, acquiring first network information that identifies a first internal network, and second network information that identifies a second internal network, the first internal network being connected to the external network, and the second internal network being connected to the external network, deciding a first method based on the first network information and the second network information, the first method indicating a method of transmission from a first communication device to a second communication device, and of transmission from the second communication device to the first communication device, the first communication device being configured to be connectable to the first internal network, and the second communication device being configured to be connectable to the second internal network and first sending information indicating the first method to the first communication device and the second communication device.

Embodiments further provide a non-transitory computer-readable medium storing computer-readable instructions that, when executed by a processor of a communication device, cause the processor to perform the steps of, acquiring first network information that identifies a first internal network to which the communication device is connected, and second network information that identifies a second internal network to which another communication device is connected, the first internal network being connected to an external network, and the second internal network being connected to the external network, deciding a first method based on the first network information and the second network information, the first method being used to communicate with the other communication device, notifying information indicating the first method to the other communication device, and establishing a session with the other communication device based on the information indicating the first method, and performing communication using the first method.

BRIEF DESCRIPTION OF THE DRAWINGS

Embodiments will be described below in detail with reference to the accompanying drawings in which:

FIG. 5 is a schematic diagram showing a first table;

FIG. 8 is a schematic diagram showing the second table;

FIG. 9 is a schematic diagram showing the second table;

DETAILED DESCRIPTION

Figure 1:
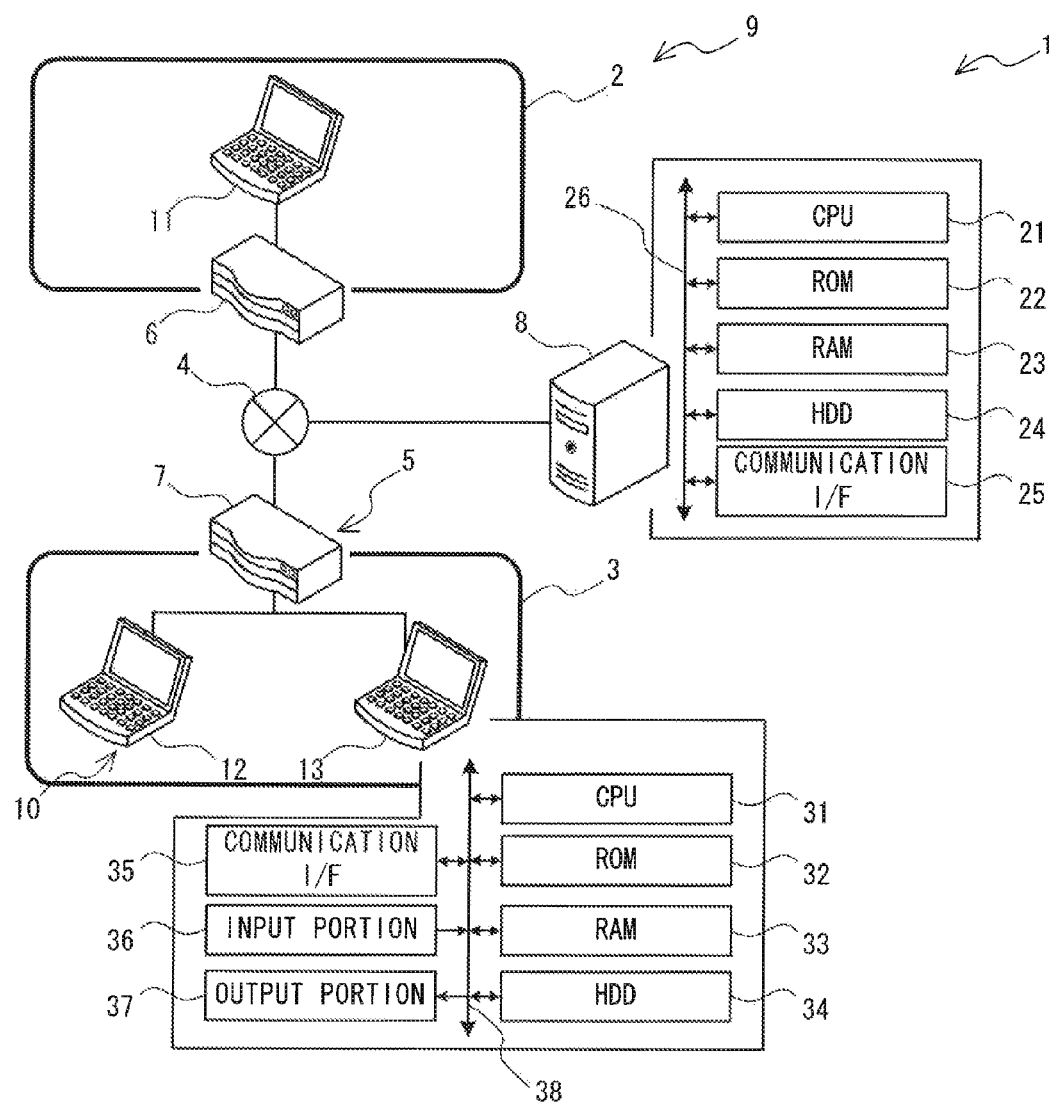
FIG. 1 is a diagram showing an overview of a communication system, and electrical configurations of a communication control device and a communication device.

Hereinafter, an embodiment of the present disclosure will be explained with reference to the drawings. These drawings are used to explain technical features that can be adopted by the present disclosure. Device configurations, flowcharts of various types of processing and the like that are shown in the drawings are simply explanatory examples and do not limit the present disclosure to only those examples.

An overview of a communication system 1 will be explained with reference to FIG. 1. The communication system 1 includes a communication control device 8, communication devices 11, 12, and 13, and relay devices 6 and 7. When the communication devices 11, 12, and 13 not particularly distinguished, the communication devices 11, 12, and 13 are referred to as communication devices 10 (or a communication device 10). When the relay devices 6 and 7 not distinguished, the relay devices 6 and 7 are referred to as relay devices 5 (or a relay device 5). The communication control device 8 may be connected to a network 4. The relay device 5 includes a WAN side port that can be connected to a wide area network (WAN), and a LAN side port that can be connected to a local area network (LAN). The WAN side port of the relay device 5 may be connected to the network 4. The network 4 is an Internet network. Note that, in the present embodiment, an ID that identifies the communication device 10 is represented by the number "10" that is used as a reference number. That is, IDs of the communication devices 11, 12 and 13 are, respectively, "11" "12" and "13".

The LAN side port of the relay device 6 may be connected to a LAN 2. The communication device 11 may be connected to the LAN 2. The relay device 6 is located between the network 4 and the LAN 2. The relay device 6 may relay data when the communication device 11 communicates with a device outside the LAN 2 via the network 4. The LAN side port of the relay device 7 may be connected to a LAN 3. The communication devices 12 and 13 may be connected to the LAN 3. The relay device 7 is located between the network 4 and the LAN 3, and may relay data when the communication devices 12 and 13 communicate with a device outside the LAN 3 via the network 4. Hereinafter, when the LAN 2 and the LAN 3 not distinguished, the LAN 2 and the LAN 3 are expressed as LANs 9 (or a LAN 9).

An IP address that is valid in the network 4 (hereinafter referred to as a global IP address) is assigned to the WAN side port of the relay device 5. An IP address that is effective in the LAN 9 (hereinafter referred to as a local IP address) is assigned to the LAN side port of the relay device 5. When the relay device 5 relays data from the network 4 to the LAN 9, the relay device 5 converts an IP address of a data transmission destination into a local IP address of a destination device. When the relay device 5 relays data from the LAN 9 to the network 4, the relay device 5 converts an IP address of a data transmission source into a global IP address that is assigned to the WAN side. The relay device 5 is, for example, a gateway, a proxy server, a network address translation (NAT) device, a router or the like.

The communication control device 8 may decide a communication method between the communication devices 10 to be either a client-server (C/S) communication method or a peer to peer (P2P) communication method. The communication control device 8 may control the communication devices 10 such that the communication devices 10 communicate each other with the decided communication method.

An electrical configuration of the communication control device 8 will be explained. The communication control device 8 includes a CPU 21 that may perform overall control of the communication control device 8. The CPU 21 is electrically connected to a ROM 22, a RAM 23, a hard disk drive (hereinafter referred to as an HDD) 24 and a communication interface (hereinafter referred to as a communication I/F) 25 via a bus 26. A boot program, a basic input/output system (BIOS) and the like may be stored in the ROM 22. Temporary data, such as that of a timer, a counter or the like, may be stored in the RAM 23. A control program of the CPU 21 and an operating system (OS) may be stored in the HDD 24. The communication I/F 25 is an interface to communicate via the network 4. Note that a timer value that may be stored in the RAM 23 is a value indicating a current time, which is acquired by a time measurement function that is normally included in the OS stored in the HDD 24.

An electrical configuration of the communication device 10 will be explained. The communication device 10 includes a CPU 31 that may perform overall control of the communication device 10. The CPU 31 is electrically connected to a ROM 32, a RAM 33, an HDD 34 and a communication I/F 35 via a bus 38. An input portion 36 and an output portion 37 are respectively electrically connected to the bus 38 of the communication device 10 in a detachable manner, via an interface circuit (not shown in the drawings). A boot program, a BIOS and the like may be stored in the ROM 32. Temporary data, such as that of a timer, a counter or the like, may be stored in the RAM 33. A control program of the CPU 31 and an OS may be stored in the HDD 34. The communication I/F 35 is an interface to communicate with the relay device 5 and the other communication devices 10. The input portion 36 may be a keyboard, a mouse, a microphone or the like that may be used to input information to the communication device 10. The output portion 37 may be a display, a speaker or the like that may output information to a user of the communication device 10. Note that a timer value that may be stored in the RAM 33 is a value indicating a current time, which is acquired by a time measurement function that is normally included in the OS stored in the HDD 34.

Figure 2:
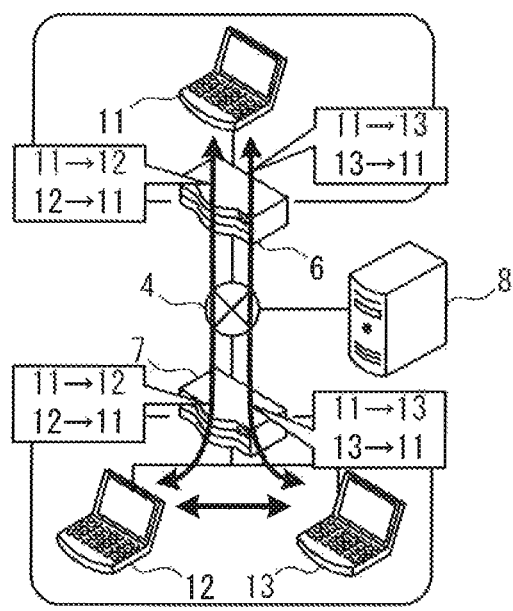
FIG. 2 is a diagram showing a case in which P2P communication is performed among communication devices.
Figure 3:
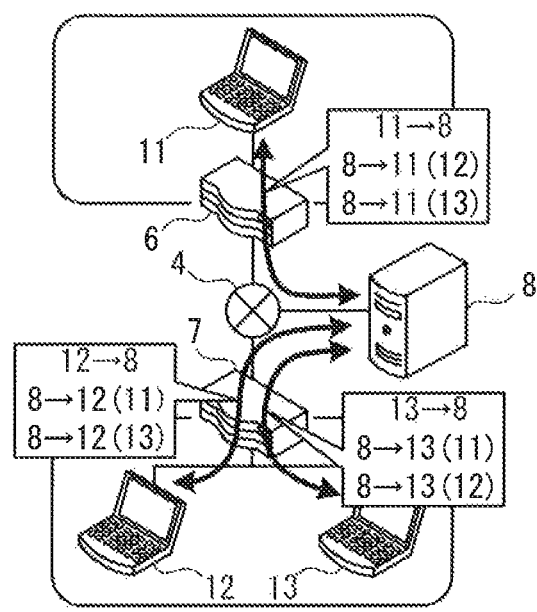
FIG. 3 is a diagram showing a case in which C/S communication is performed among the communication devices.
Figure 4:
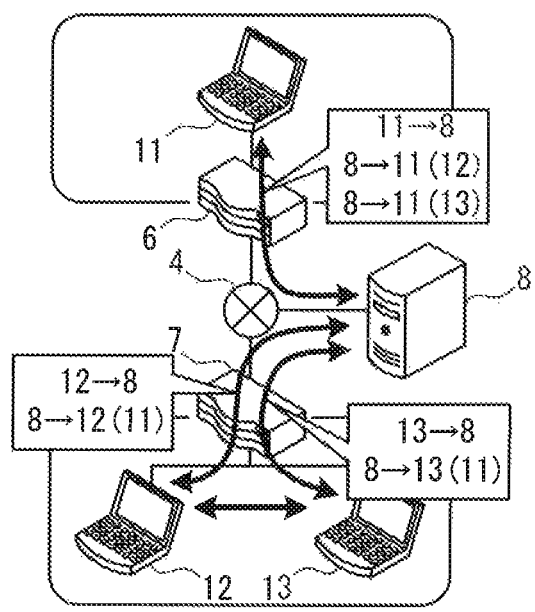
FIG. 4 is a diagram showing a case in which the C/S communication is performed between communication devices, and the P2P communication is performed between communication devices.

A manner in which the amount of data relayed by the relay device 5 changes during communication between the communication devices 10 will be explained with reference to FIG. 2 to FIG. 4. The amount of data relayed by the relay device 5 may be changed in accordance with a communication method (the C/S communication method or the P2P communication method). Note that, hereinafter, cases will be used in which same data is transmitted from one of the communication devices 10 to all the other communication devices 10. A remote conference system is an example in which this type of communication is performed. In the remote conference system, video data indicating video images and audio data indicating audio captured by and recorded by one of the communication devices 10 may be transmitted to all the other communication devices 10, and thus remote conference participants may share the same conditions.

A case in which P2P communication is performed among the communication devices 11, 12 and 13 will be explained with reference to FIG. 2. The communication device 11 transmits data that includes at least one of video data and audio data to the communication devices 12 and 13. A packet is considered as a unit of data that is transmitted. The transmitted packet reaches the communication devices 12 and 13 via the relay device 6, the network 4 and the relay device 7. For example, in a case in which the relay device 6 transmits a total of two packets, including a packet whose destination is the communication device 12 and a packet whose destination is the communication device 13, to the relay device 7 via the network 4, the relay device 6 relays the two packets. In other words, the number of times of the packet relay by the relay device 6 is two. The relay device 7 relays the packet whose destination is the communication device 12, which has been received from the relay device 6, to the communication device 12. The relay device 7 relays the packet whose destination is the communication device 13, which has been received from the relay device 6, to the communication device 13. In other words, the number of times of the packet relay by the relay device 7 is two. Therefore, in a case where data is transmitted from the communication device 11 to the communication devices 12 and 13, a total number of times that the relay devices 6 and 7 relay the data is four. Although, here, the explanation is made using the packets as an example, transmission of a predetermined number of packets is hereinafter simply referred to as "data is transmitted", in order to simplify the description. Note that the number of times of the data relay can also be construed as a total number of times that all channels that are necessary to transmit and receive data between the communication devices 11, 12 and 13 pass through the relay devices 6 and 7.

The communication device 12 transmits data to the communication devices 11 and 13. The data transmitted to the communication device 11 reaches the communication device 11 via the relay device 7, the network 4 and the relay device 6. In a case where the aforementioned communication is performed, the relay devices 6 and 7 relay the data transmitted from the communication device 12 to the communication device 11. On the other hand, since the communication devices 12 and 13 are connected to the same LAN 3, the data transmitted from the communication device 12 to the communication device 13 reaches the communication device 13 without passing through the relay devices 6 and 7. Therefore, in a case where the data is transmitted from the communication device 12 to the communication devices 11 and 13, a total number of times that the relay devices 6 and 7 relay the data is two. Specifically, the relay device 6 relays the data from the communication device 12 to the communication device 11. The relay device 7 relays the data from the communication device 12 to the communication device 11.

The communication device 13 transmits data to the communication devices 11 and 12. The data transmitted to the communication device 11 reaches the communication device 11 via the relay device 7, the network 4 and the relay device 6. When the aforementioned communication is performed, the relay devices 6 and 7 relay the data transmitted from the communication device 13 to the communication device 11. On the other hand, since the communication devices 12 and 13 are connected to the same LAN 3, the data transmitted from the communication device 13 to the communication device 12 reaches the communication device 12 without passing through the relay devices 6 and 7. Therefore, in a case where the data is transmitted from the communication device 13 to the communication devices 11 and 12, a total number of times that the relay devices 6 and 7 relay the data is two. Specifically, the relay device 6 relays the data from the communication device 13 to the communication device 11. The relay device 7 relays the data from the communication device 13 to the communication device 11. As a result of the above, in a case where P2P communication is performed among the communication devices 11, 12 and 13, a total number of times that the relay devices 6 and 7 relay the data is eight.

A case in which C/S communication is performed among the communication devices 11, 12 and 13 will be explained with reference to FIG. 3. The communication device 11 transmits data to the communication control device 8. The transmitted data reaches the communication control device 8 via the relay device 6 and the network 4. Next, the communication control device 8 transmits the data received from the communication device 11 to the communication devices 12 and 13. The transmitted data reaches the communication devices 12 and 13 via the network 4 and the relay device 7. Therefore, in a case where the data is transmitted from the communication device 11 to the communication devices 12 and 13, a total number of times that the relay devices 6 and 7 relay the data is three. Specifically, the relay device 6 relays the data from the communication device 11 to the communication control device 8. The relay device 7 relays the data (the data transmitted from the communication device 11) from the communication control device 8 to the communication device 12, and relays the data (the data transmitted from the communication device 11) from the communication control device 8 to the communication device 13.

The communication device 12 transmits data to the communication control device 8. The transmitted data reaches the communication control device 8 via the relay device 7 and the network 4. Next, the communication control device 8 transmits the data received from the communication device 12 to the communication devices 11 and 13. The data transmitted to the communication device 11 reaches the communication device 11 via the network 4 and the relay device 6. The data transmitted to the communication device 13 reaches the communication device 13 via the network 4 and the relay device 7. Therefore, in a case where the data is transmitted from the communication device 12 to the communication devices 11 and 13, a total number of times that the relay devices 6 and 7 relay the data is three. Specifically, the relay device 6 relays the data (the data transmitted from the communication device 12) from the communication control device 8 to the communication device 11. The relay device 7 relays the data from the communication device 12 to the communication control device 8, and relays the data (the data transmitted from the communication device 12) from the communication control device 8 to the communication device 13.

The communication device 13 transmits data to the communication control device 8. The transmitted data reaches the communication control device 8 via the relay device 7 and the network 4. Next, the communication control device 8 transmits the data received from the communication device 13 to the communication devices 11 and 12. The data transmitted to the communication device 11 reaches the communication device 11 via the network 4 and the relay device 6. The data transmitted to the communication device 12 reaches the communication device 12 via the network 4 and the relay device 7. Therefore, in a case where the data is transmitted from the communication device 13 to the communication devices 11 and 12, a total number of times that the relay devices 6 and 7 relay the data is three. Specifically, the relay device 6 relays the data (the data transmitted from the communication device 13) from the communication control device 8 to the communication device 11. The relay device 7 relays the data from the communication device 13 to the communication control device 8, and relays the data (the data transmitted from the communication device 13) from the communication control device 8 to the communication device 12. As a result of the above, in a case where C/S communication is performed among the communication devices 11, 12 and 13, a total number of times that the relay devices 6 and 7 relay the data is nine.

A case in which the C/S communication is performed between the communication devices 11 and 12 and between the communication devices 11 and 13, and the P2P communication is performed between the communication devices 12 and 13 will be explained with reference to FIG. 4. A case in which the communication device 11 transmits data to the communication devices 12 and 13 is the same as the case shown in FIG. 3, and an explanation thereof is thus omitted here. Accordingly, in a case where the data is transmitted from the communication device 11 to the communication devices 12 and 13, a total number of times that the relay devices 6 and 7 relay the data is three. Specifically, the relay device 6 relays the data from the communication device 11 to the communication control device 8. The relay device 7 relays the data (the data transmitted from the communication device 11) from the communication control device 8 to the communication device 12, and relays the data (the data transmitted from the communication device 11) from the communication control device 8 to the communication device 13.

The communication device 12 transmits data to the communication control device 8. The transmitted data reaches the communication control device 8 via the relay device 7 and the network 4. Next, the communication control device 8 transmits, to the communication device 11, the data received from the communication device 12. The data transmitted to the communication device 11 reaches the communication device 11 via the network 4 and the relay device 6. Therefore, in a case where the data is transmitted from the communication device 12 to the communication device 11, a total number of times that the relay devices 6 and 7 relay the data is two. Specifically, the relay device 6 relays the data (the data transmitted from the communication device 12) from the communication control device 8 to the communication device 11. The relay device 7 relays the data from the communication device 12 to the communication control device 8.

The communication device 13 transmits data to the communication control device 8. The transmitted data reaches the communication control device 8 via the relay device 7 and the network 4. Next, the communication control device 8 transmits, to the communication device 11, the data received from the communication device 13. The data transmitted to the communication device 11 reaches the communication device 11 via the network 4 and the relay device 6. Therefore, in a case where the data is transmitted from the communication device 13 to the communication device 11, a total number of times that the relay devices 6 and 7 relay the data is two. Specifically, the relay device 6 relays the data (the data transmitted from the communication device 13) from the communication control device 8 to the communication device 11. The relay device 7 relays the data from the communication device 13 to the communication control device 8.

Note that the communication devices 12 and 13 are connected to the same LAN 3. Therefore, the data transmitted from the communication device 12 to the communication device 13 reaches the communication device 13 without passing through the relay devices 6 and 7, unlike the case shown in FIG. 3. In a similar manner, the data transmitted from the communication device 13 to the communication device 12 reaches the communication device 12 without passing through the relay devices 6 and 7. As a result of the above, in a case where the C/S communication is performed between the communication devices 11 and 12 and between the communication devices 11 and 13 and the P2P communication is performed between the communication devices 12 and 13, a total number of times that the relay devices 6 and 7 relay the data is seven.

As explained above, the total number of times that the relay devices 5 relay the data may differ depending on the communication method used between the communication devices 10. Thus, the total number of times that the relay devices 5 relay the data can be reduced by optimizing the communication method for each of the communication channels. As the number of times that the relay devices 5 relay the data increases, the amount of data relayed by the relay devices 5 also increases and the processing load on the relay devices 5 increases. Here, in a case where the load on the relay devices 5 exceeds a permissible range, a time required for the relay devices 5 to relay the data may become longer. In a case where the time required for the relay devices 5 to relay the data becomes longer, it may cause a communication delay between the communication devices 10. For that reason, it is preferable to reduce the number of times that the relay devices 5 relay the data.

The communication control device 8 may decide the communication method between the communication devices 10 for each of the communication channels such that the total number of times that the relay devices 5 relay the data decreases. The communication control device 8 may control the communication devices 10 such that communication between the communication devices 10 is performed using the decided communication method. By doing this, the communication control device 8 may reduce the processing load on the relay devices 5 so that smooth communication with little communication delay is performed between the communication devices 10. As a result, communication reliability between the communication devices 10 is improved. The details are as follows.

A first table 241 that is stored in the HDD 24 of the communication control device 8 will be explained with reference to FIG. 5. The first table 241 is a table that may be used by the communication control device 8 to manage address information of the communication devices 10. A global IP address, a local IP address and a local network address are associated with the IDs of the communication devices 10 and stored in the first table 241. The global IP address is a global IP network address that is assigned to the WAN side port of the relay device 5 located between the communication device 10 and the network 4. The local IP address is a local IP address that is assigned to the communication device 10. The local network address is a network address of the LAN 9 to which the communication device 10 is connected. Hereinafter, the global IP address, the local IP address and the local network address are also collectively referred to as address information.

The first table 241 may be created in the following manner. Before the communication device 10 establishes a session with another communication device 10 and starts communication, the communication device 10 may transmit, to the communication control device 8 via the relay device 5, data (hereinafter referred to as a registration request) requesting registration of the address information. The local IP address of the communication device 10 and the local network address of the LAN 9 to which the communication device 10 is connected are stored in the registration request. The communication control device 8 may receive the registration request from the communication device 10 via the relay device 5. The communication control device 8 may acquire, from the registration request, the address information to be stored in the first table 241. The local IP address and the local network address, which are included in the address information, are directly acquired from the registration request. A transmission source IP address of the registration request is acquired as the global IP address. The communication control device 8 may associate the acquired address information with the ID of the communication device 10 that has transmitted the registration request, and store information that the global IP address, the local IP address and the local network address, and the ID are associated with each other in the first table 241.

The communication control device 8 may refer to the first table 241 and thereby identify the LAN 9 to which the communication device 10 is connected. Based on the identified LAN 9, the communication control device 8 may decide the communication method between the communication devices 10 on the basis of the following criteria (1), (2-1), (2-2) and (3).

The criterion (1) is a state in which the communication device 10 that has requested the session establishment and the communication device 10 with which the session is requested to be established are connected to the same LAN 9. Hereinafter, the communication device 10 that has requested the session establishment is also referred to as a first communication device. The communication device 10 with which the session is requested to be established is also referred to as a second communication device. In a case where the criterion (1) is satisfied, the communication control device 8 decides the P2P communication method as the communication method to be used for communication from the first communication device to the second communication device, and as the communication method to be used for communication from the second communication device to the first communication device (hereinafter also referred to as a first communication method).

In a case where the first communication device and the second communication device are connected to the same LAN 9, the first communication device and the second communication device are in a state in which they can directly communicate without passing through the relay device 5. In a case where the P2P communication is performed between the first communication device and the second communication device, the data transmitted and received between the first communication device and the second communication device is transmitted within the LAN 9. As a result, the relay device 5 need not relay the data. Therefore, by deciding that the first communication method is the P2P communication method, the communication control device 8 can reduce the total number of times that the relay device 5 relays the data, and can reduce the amount of data relayed by the relay device 5 to the minimum.

For example, in a case where the P2P communication is performed between the communication devices 12 and 13 (refer to FIG. 2 and FIG. 4), the total number of times that the relay device 7 relays data is zero. On the other hand, in a case where the C/S communication is performed between the communication devices 12 and 13 (refer to FIG. 3), the total number of times that the relay device 7 relays data is four. Specifically, in a case where the data is transmitted from the communication device 12 to the communication device 13, the relay device 7 relays the data from the communication device 12 to the communication control device 8, and relays the data from the communication control device 8 to the communication device 13. In a case where the data is transmitted from the communication device 13 to the communication device 12, the relay device 7 relays the data from the communication device 13 to the communication control device 8, and relays the data from the communication control device 8 to the communication device 12. In this manner, when it is decided that the P2P communication method is used as the first communication method, the total number of times that the relay device 7 relays the data is reduced compared to a case in which it is decided that the C/S communication method is used as the communication method.

The criterion (2-1) is a state in which the first communication device and the second communication device are connected to the different LANs 9, and in which a communication device other than the second communication device is connected to a LAN 9 that is different from the LAN 9 to which the first communication device is connected, and a session is established between the first communication device and the communication device other than the second communication device. Hereinafter, the communication device that is other than the second communication device and that is connected to the LAN 9 different from the LAN 9 to which the first communication device is connected is referred to as a third communication device. In a case where the criterion (2-1) is satisfied, the communication control device 8 decides the C/S communication method as the communication method to be used for communication from the first communication device to the second communication device, and as the communication method to be used for communication from the first communication device to the third communication device (hereinafter also referred to as a second communication method).

The criterion (2-2) is a state in which the first communication device and the second communication device are connected to the different LANs 9, and in which the third communication device is connected to the LAN 9 that is different from the LAN 9 to which the first communication device is connected, and a session is established between the first communication device and the third communication device. That is, the state of the criterion (2-2) is the same as the state of the criterion (2-1). In a case where the criterion (2-2) is satisfied, the communication control device 8 decides either the P2P communication method or the C/S communication method, as the communication method to be used for communication from the second communication device to the first communication device. Note that, in the present embodiment, in a case where the criterion (2-2) is satisfied, the communication control device 8 decides the P2P communication method as the communication method to be used for communication from the second communication device to the first communication device.

In a case where the C/S communication method is used to communicate, the communication control device 8 can transmit the data received from the first communication device to the second communication device and the third communication device. In such a case, it is not necessary for the first communication device to separately transmit the data to each of the second communication device and the third communication device. The first communication device may create shared data to be transmitted to the second communication device and the third communication device that are connected to the different LANs 9, and may transmit the shared data to the communication control device 8. In a case where the C/S communication method is decided as the second communication method, the communication control device 8 can use the shared data to be transmitted from the first communication device to the second communication device, and from the first communication device to the third communication device. Therefore, the communication control device 8 can appropriately reduce the amount of data relayed by the relay device 5.

For example, in a case where the C/S communication is performed and data is transmitted from the communication device 11 to the communication devices 12 and 13 (refer to FIG. 3 and FIG. 4), the total number of times that the relay device 6 relays the data is one. Specifically, the relay device 6 relays the data from the communication device 11 to the communication control device 8. On the other hand, in a case where the P2P communication is performed and data is transmitted from the communication device 11 to the communication devices 12 and 13 (refer to FIG. 2), the total number of times that the relay device 6 relays the data is two. Specifically, the relay device 6 relays the data from the communication device 11 to the communication device 12, and relays the data from the communication device 11 to the communication device 13. In this manner, in a case where it is decided that the C/S communication method is used as the second communication method, the total number of times that the relay device 6 relays the data is reduced compared to a case in which it is decided that the P2P communication method is used as the communication method.

Note that, whichever one of the P2P communication method and the C/S communication is decided as the communication method to be used for communication from the second communication device to the first communication device, the number of times that the relay device 5 relays the data does not change. In the present embodiment, the communication control device 8 prioritizes reducing the processing load on the communication control device 8 and decides the P2P communication method as the communication method. In this manner, the communication control device 8 can perform control such that communication between the communication devices 10 is performed using the specified communication method, while reducing the amount of data relayed by the relay device 5.

The criterion (3) is a state in which the first communication device and the second communication device are connected to the different LANs 9, and in which the third communication device does not exist or the session between the first communication device and the third communication device is not established. In a case where the criterion (3) is satisfied, the communication control device 8 decides either the P2P communication method or the C/S communication method as the communication method to be used for communication from the first communication device to the second communication device, and as the communication method to be used for communication from the second communication device to the first communication device (hereinafter also referred to as a fourth communication method). Note that, in the present embodiment, the communication control device 8 decides the P2P communication method as the fourth communication method, in the same manner as when the above-described criterion (2-2) is satisfied. The number of times that the relay device 5 relays the data does not change depending on whether the P2P communication method or the C/S communication method is decided as the fourth communication method. For that reason, the communication control device 8 prioritizes reducing the processing load on the communication control device 8, and decides the P2P communication method as the fourth communication method, in the same manner as when the criterion (2-2) is satisfied.

The method for deciding the communication method by the communication control device 8 will be specifically explained with reference to FIG. 6 to FIG. 9. In the explanation below, at the beginning, a session is not established among the communication devices 11, 12 and 13 and that communication has not been started. Further, the communication control device 8 has already received the registration request from each of the communication devices 11, 12 and 13, and IDs and the address information of the communication devices 11, 12 and 13 have already been stored in the first table 241 (refer to FIG. 5).

Figure 6:
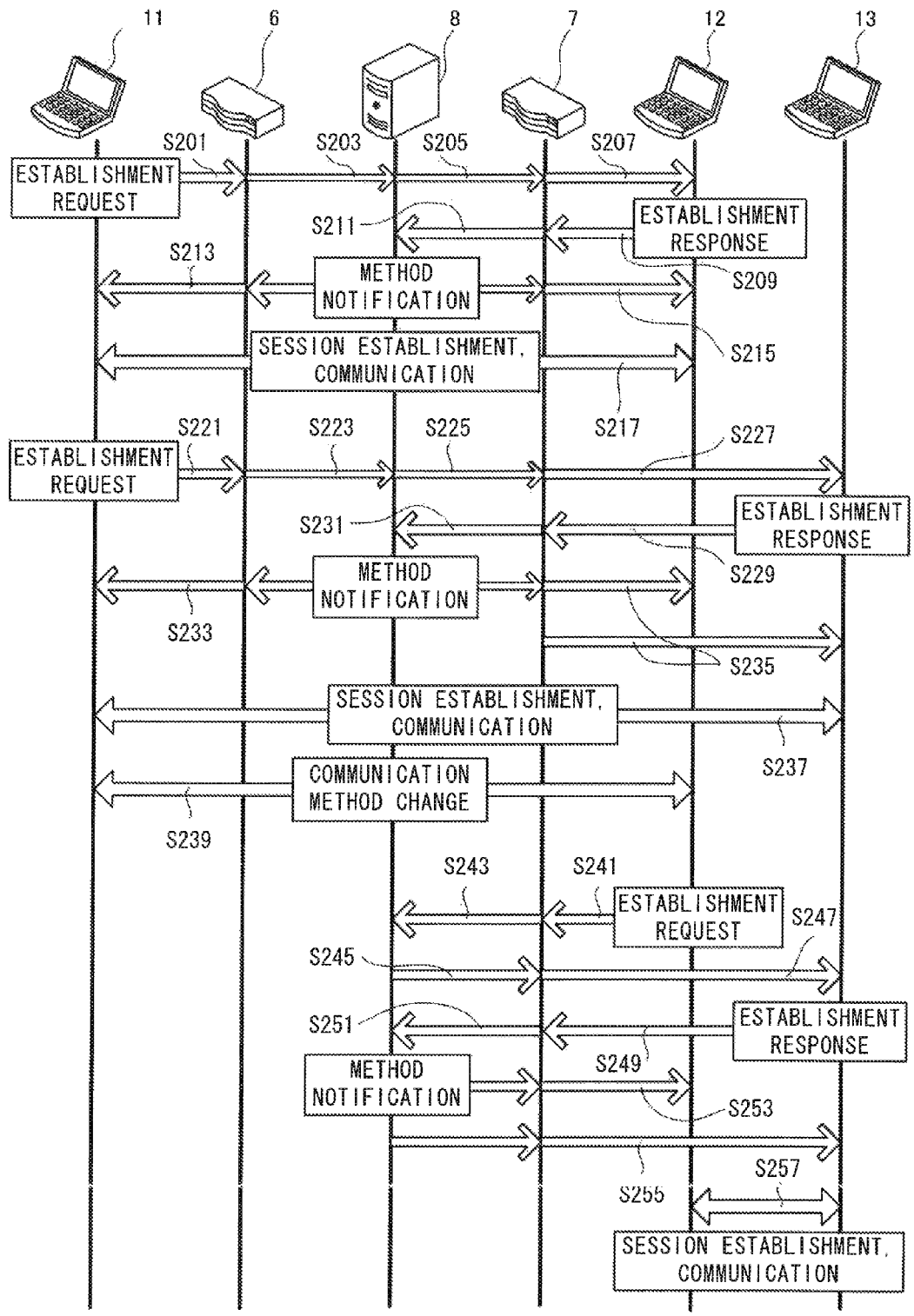
FIG. 6 is a diagram showing a communication sequence.

When the communication device 11 requests the start of communication with the communication device 12, as shown in FIG. 6, the communication device 11 transmits, to the communication control device 8 via the relay device 6, data (hereinafter referred to as an establishment request) requesting session establishment in order to establish a session with the communication device 12 (S201). The relay device 6 receives the establishment request and relays the establishment request to the communication control device 8 (S203). The communication control device 8 receives the establishment request. The communication control device 8 transmits the received establishment request to the communication device 12 via the relay device 7 so that the communication device 12 is notified that the session establishment is requested from the communication device 11 (S205). The relay device 7 receives the establishment request and relays the establishment request to the communication device 12 (S207). The communication device 12 receives the establishment request.

In a case where the communication device 12 permits the establishment of the session with the communication device 11, the communication device 12 transmits, to the communication control device 8 via the relay device 7, data (hereinafter referred to as an establishment response) that permits the session establishment (S209). For example, in a case where the communication device 10 that has received the establishment request accepts a permission command, the communication device 10 permits the establishment of the session with the communication device 10 that has transmitted the establishment request. The permission command may be input by the user via the input portion 36, for example. The relay device 7 receives the establishment response and relays the establishment response to the communication control device 8 (S211). The communication control device 8 receives the establishment response.

The communication control device 8 decides the communication method between the communication devices 11 and 12 based on the first table 241 (refer to FIG. 5). The communication control device 8 determines whether the LAN 2 (refer to FIG. 1) connected to the communication device 11 (corresponding to the first communication device) that has requested the session establishment is the same as the LAN 3 (refer to FIG. 1) connected to the communication device 12 (corresponding to the second communication device) with which the session is requested to be established. This determination may be made based on whether the global IP address associated with the ID "11" and the global IP address associated with the ID "12" match each other in the first table 241. In the first table 241, the global IP addresses associated with the ID "11" and the ID "12" are different from each other. The global IP address stored in the first table 241 corresponds to the global IP address of the WAN side port of the relay device 5 connected to the LAN 9. Accordingly, in a case where the global IP addresses are different from each other, this means that the relay devices 5 connected to the LAN 9 are different from each other. The communication control device 8 determines that the LAN 9 (i.e., the LAN 2) to which the communication device 11 is connected is different from the LAN 9 (i.e., the LAN 3) to which the communication device 12 is connected.

Next, the communication control device 8 determines whether another one of the communication devices 10 that is other than the communication device 12 is connected to the LAN 9 other than the LAN 2 to which the communication device 11 is connected. This determination may be made based on whether the global IP address different from the global IP address corresponding to the ID "11" is associated with the ID of the other communication device 10. In the first table 241, the global IP address 2.2.2.2, which is different from the global IP address 1.1.1.1 associated with the ID "11", is associated with the ID "13". This means that there is the communication device 13 connected to the LAN 3 that is different from the LAN 2 to which the communication device 11 is connected. The communication control device 8 determines that the communication device 13 (corresponding to the third communication device) is connected to the LAN 3 that is different from the LAN 2 to which the communication device 11 is connected.

Next, the communication control device 8 determines whether the session between the communication devices 11 and 13 has already been established. As described above, the session between the communication devices 11 and 13 has not been established at this point in time. The above result satisfies the above-described criterion (3). The communication control device 8 decides the P2P communication method as the communication method to be used for communication from the communication device 11 to the communication device 12, and as the communication method to be used for communication from the communication device 12 to the communication device 11 (the fourth communication method).

Figure 7:
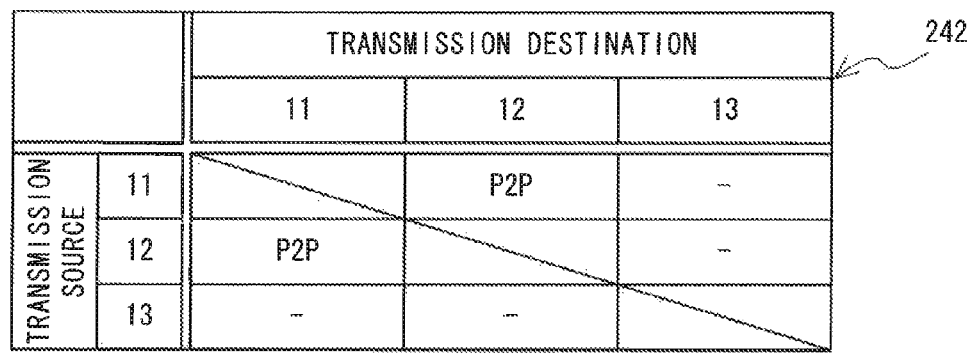
FIG. 7 is a schematic diagram showing a second table.

FIG. 7 shows a second table 242 that is stored in the HDD 24 of the communication control device 8. The second table 242 is a table to manage the communication method between the communication devices 10. As described above, the P2P communication method is decided as the communication method to be used for communication from the communication device 11 to the communication device 12, and as the communication method to be used for communication from the communication device 12 to the communication device 11. The communication control device 8 stores, in the second table 242, information indicating that both the communication methods to be used for communication from the communication device 11 to the communication device 12, and the communication method to be used for communication from the communication device 12 to the communication device 11 are the P2P communication method.

Next, the communication control device 8 transmits, to the communication device 11 via the relay device 6, data (hereinafter referred to as a method notification) that notifies the decided communication method, as shown in FIG. 6 (S213). Further, the communication control device 8 transmits the method notification to the communication device 12 via the relay device 7 (S215). Note that the relay device 6 relays the establishment request from the communication device 11 to the communication control device 8 at S203. Therefore, the relay device 6 can identify the communication device 11 as the transmission destination of the method notification received from the communication control device 8, and can transmit the method notification. The relay device 7 receives the establishment response from the communication device 12 at S211. Therefore, the relay device 7 can identify the communication device 12 as the transmission destination of the method notification received from the communication control device 8, and can transmit the method notification. The communication devices 11 and 12 receive the method notification and recognize that the decided communication method is the P2P communication method. The communication devices 11 and 12 may establish a session to start P2P communication. The communication devices 11 and 12 are able to perform P2P communication (S217). Therefore, the communication from the communication device 11 to the communication device 12 and the communication from the communication device 12 to the communication device 11 are performed based on the P2P communication method.

When the communication device 11 requests the start of communication with the communication device 13, the communication device 11 transmits the establishment request to the communication control device 8 via the relay device 6 (S221). The relay device 6 receives the establishment request and relays the establishment request to the communication control device 8 (S223). The communication control device 8 receives the establishment request. The communication control device 8 transmits the received establishment request to the communication device 13 via the relay device 7 (S225). The relay device 7 receives the establishment request and relays the establishment request to the communication device 13 (S227). The communication device 13 receives the establishment request. In a case where the communication device 13 permits the establishment of the session with the communication device 11, the communication device 13 transmits the establishment response to the communication control device 8 via the relay device 7 (S229). The relay device 7 receives the establishment response and relays the establishment response to the communication control device 8 (S231). The communication control device 8 receives the establishment response.

The communication control device 8 decides the communication method between the communication devices 11 and 13 based on the first table 241 (refer to FIG. 5). The communication control device 8 determines whether the LAN 2 connected to the communication device 11 (corresponding to the first communication device) that has requested the session establishment is the same as the LAN 3 connected to the communication device 13 (corresponding to the second communication device) with which the session is requested to be established. This determination may be made based on whether the global IP address associated with the ID "11" and the global IP address associated with the ID "13" match each other in the first table 241. In the first table 241, the global IP addresses associated with the ID "11" and the ID "13" are different from each other. The communication control device 8 determines that the LAN 2 to which the communication device 11 is connected is different from the LAN 3 to which the communication device 12 is connected.

Next, the communication control device 8 determines whether another one of the communication devices 10 that is other than the communication device 13 is connected to the LAN 9 other than the LAN 2 to which the communication device 11 is connected. This determination is made based on whether the global IP address different from the global IP address corresponding to the ID "11" is associated with the ID of the other communication device 10. In the first table 241, the global IP address 2.2.2.2, which is different from the global IP address 1.1.1.1 associated with the ID "11", is associated with the ID "12". The communication control device 8 determines that the communication device 12 (corresponding to the third communication device) is connected to the LAN 3 that is different from the LAN 2 to which the communication device 11 is connected.

Next, the communication control device 8 determines whether the session between the communication devices 11 and 12 has already been established. As described above, the session between the communication devices 11 and 12 is established at S217. The above result satisfies the above-described criteria (2-1) and (2-2). Since the criterion (2-1) is satisfied, the communication control device 8 decides the C/S communication method as the communication method to be used for communication from the communication device 11 to the communication device 12, and as the communication method to be used for communication from the communication device 11 to the communication device 13 (the second communication method). Further, since the criterion (2-2) is satisfied, the communication control device 8 decides the P2P communication method as the communication method to be used for communication from the communication device 13 to the communication device 11.

As shown in FIG. 8, the communication control device 8 stores, in the second table 242, information indicating that both the communication method to be used for communication from the communication device 11 to the communication device 12, and the communication method to be used for communication from the communication device 11 to the communication device 13 are the C/S communication method. Note that, as shown in FIG. 7, the information indicating that the communication method to be used for communication from the communication device 11 to the communication device 12 is the P2P communication method is stored in the table 242. In this case, the communication control device 8 changes the already stored information indicating the P2P communication method to the information indicating the C/S communication method. In this manner, the communication control device 8 may change the communication method of the communication between the communication devices 10 that has already been performed to the C/S communication method that is the second communication method. Hereinafter, the communication method that has already been performed between the communication devices 10 is referred to as a third communication method. By changing the communication method, the communication control device 8 can optimize communication such that the amount of data relayed by the relay device 5 is reduced. By doing this, the communication control device 8 may more appropriately reduce the amount of data relayed by the relay device 5.

Further, the communication control device 8 stores, in the second table 242, information indicating that the communication method to be used for communication from the communication device 13 to the communication device 11 is the P2P communication method.

Next, as shown in FIG. 6, the communication control device 8 transmits the method notification, which notifies the decided communication method, to the communication device 11 via the relay device 6 (S233). Further, the communication control device 8 transmits the method notification, which notifies the decided communication method, to the communication devices 12 and 13 via the relay device 7 (S235). The communication devices 11, 12 and 13 receive the method notification. The communication devices 11 and 13 establish a session to start communication using the communication method notified by the method notification. The communication devices 11 and 13 are able to communicate (S237). Further, the communication method of the session that has already been established between the communication devices 11 and 12 at S217 is changed from the P2P communication method to the C/S communication method (S239).

The communication from the communication device 11 to the communication devices 12 and 13 is performed based on the C/S communication method. Therefore, the communication device 11 transmits data addressed to the communication devices 12 and 13 to the communication control device 8 via the relay device 6. On the other hand, the communication from the communication devices 12 and 13 to the communication device 11 is performed based on the P2P communication method. Therefore, data that is transmitted from the communication devices 12 and 13 to the communication device 11 is directly transmitted to the communication device 11 via the relay devices 6 and 7.

When the communication device 12 requests the start of communication with the communication device 13, the communication device 12 transmits an establishment request to the communication control device 8 via the relay device 7 (S241). The relay device 7 receives the establishment request and relays the establishment request to the communication control device 8 (S243). The communication control device 8 receives the establishment request. The communication control device 8 transmits the received establishment request to the communication device 13 via the relay device 7 (S245). The relay device 7 receives the establishment request and relays the establishment request to the communication device 13 (S247). The communication device 13 receives the establishment request. In a case where the communication device 13 permits the establishment of the session with the communication device 12, the communication device 13 transmits an establishment response to the communication control device 8 via the relay device 7 (S249). The relay device 7 receives the establishment response and relays the establishment response to the communication control device 8 (S251). The communication control device 8 receives the establishment response.

The communication control device 8 decides the communication method between the communication devices 12 and 13 based on the first table 241 (refer to FIG. 5). The communication control device 8 determines whether the LAN 3 connected to the communication device 12 (corresponding to the first communication device) that has requested the session establishment is the same as the LAN 3 connected to the communication device 13 (corresponding to the second communication device) with which the session is requested to be established. This determination may be made based on whether the global IP address associated with the ID "12" and the global IP address associated with the ID "13" match each other in the first table 241. In the first table 241, the global IP addresses associated with the ID "12" and the ID "13" are 2.2.2.2, and they match each other. The communication control device 8 determines that the communication devices 12 and 13 are connected to the same LAN 3. The above result satisfies the above-described criterion (1). The communication control device 8 decides the P2P communication method as the communication method to be used for communication from the communication device 12 to the communication device 13, and as the communication method to be used for communication from the communication device 13 to the communication device 12 (the first communication method). As shown in FIG. 9, the communication control device 8 stores, in the second table 242, information indicating that both the communication method to be used for communication from the communication device 12 to the communication device 13, and the communication method to be used for communication from the communication device 13 to the communication device 12 are the P2P communication method.

Next, as shown in FIG. 6, the communication control device 8 transmits the method notification, which notifies the decided communication method, to the communication devices 12 and 13 via the relay device 7 (S253, S255). The communication devices 12 and 13 receive the method notification. The communication devices 12 and 13 establish a session to start communication using the communication method notified by the method notification. The communication devices 12 and 13 are able to communicate (S257). The communication from the communication device 12 to the communication device 13, and the communication from the communication device 13 to the communication device 12 are performed based on the P2P communication method.

As a result of performing the communication described above, the session is established between the communication devices 11, 12 and 13 and communication is able to be performed. The communication from the communication device 11 to the communication devices 12 and 13 is performed based on the C/S communication method. Therefore, the number of times that the relay device 6 relays data during this communication is one. Specifically, the relay device 6 relays data from the communication device 11 to the communication control device 8. The number of times that the relay device 7 relays data is two. Specifically, the relay device 7 relays data from the communication control device 8 to the communication device 12, and relays data from the communication control device 8 to the communication device 13. The communication from the communication devices 12 and 13 to the communication device 11 is performed based on the P2P communication method. Therefore, the number of times that the relay device 6 relays data during this communication is two. Specifically, the relay device 6 relays data from the communication device 12 to the communication device 11, and relays data from the communication device 13 to the communication device 11. The number of times that the relay device 7 relays data is two. Specifically, the relay device 7 relays data from the communication device 12 to the communication device 11, and relays data from the communication device 13 to the communication device 11. The communication from the communication device 12 to the communication device 13 and from the communication device 13 to the communication device 12 is performed based on the P2P communication method. Therefore, the relay device 7 does not relay data during this communication. As a result, a total number of times that the relay devices 6 and 7 relay data is seven.

Figure 10:
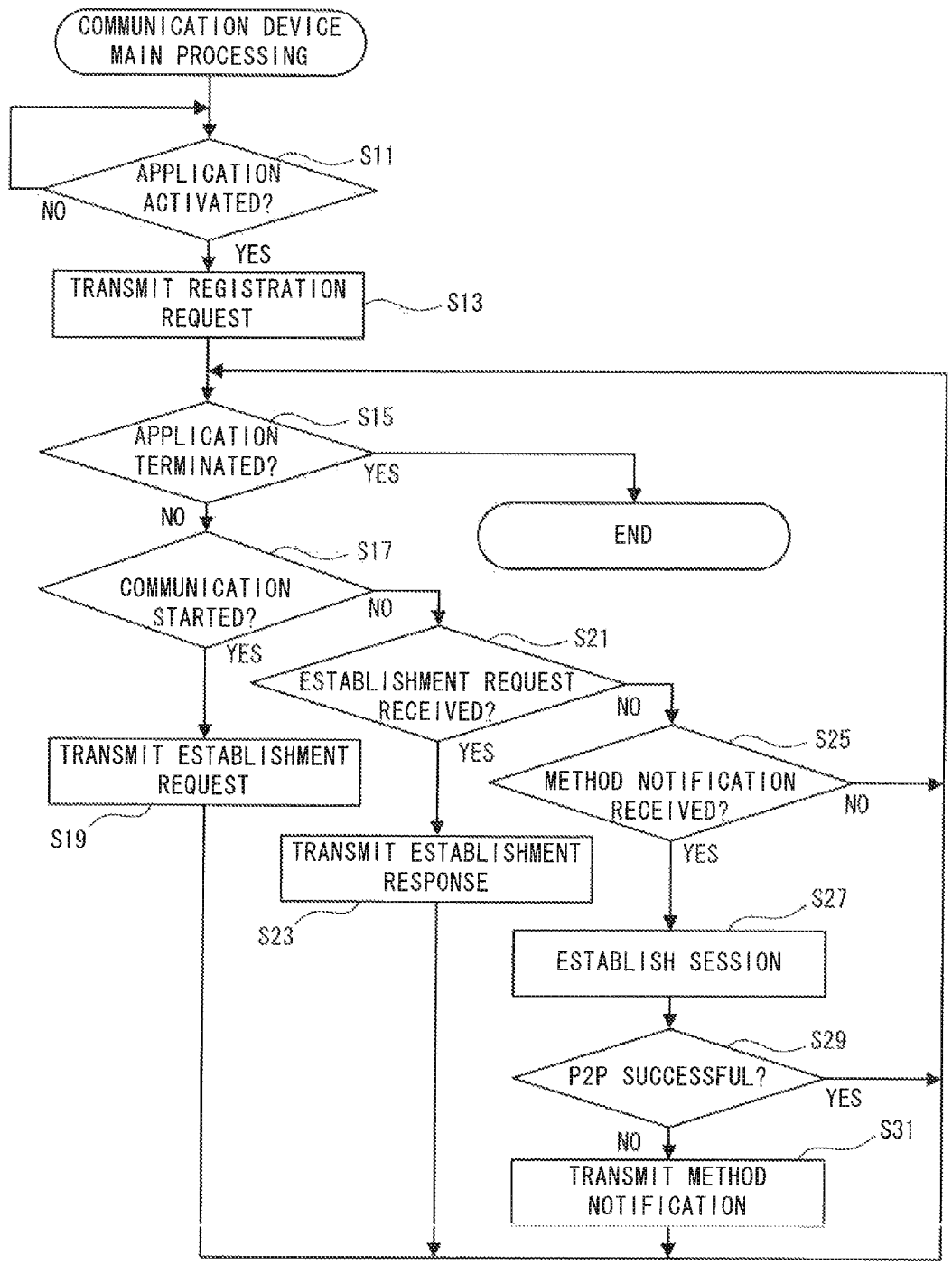
FIG. 10 is a flowchart showing communication device main processing.

Communication device main processing that is performed by the CPU 31 of the communication device 10 will be explained with reference to FIG. 10. The communication device main processing is performed by the CPU 31 of the communication device 10 in accordance with the program stored in the HDD 34. When a power supply of the communication device 10 is turned ON, the CPU 31 starts the communication device main processing.

When the communication device main processing is started, the CPU 31 determines whether a command that activates an application to communicate with at least one of the other communication devices 10 has been input via the input portion 36 (step S11). In a case where the command that activates the application has not been input (no at step S11), the CPU 31 returns the processing to step S11. In a case where the command that activates the application has been input (yes at step S11), the CPU 31 transmits the registration request to the communication control device 8 via the relay device 5 (step S13). Note that the local IP address of the communication device 10 and the local network address of the LAN 9 to which the communication device 10 is connected are included in the registration request.

Figure 11:
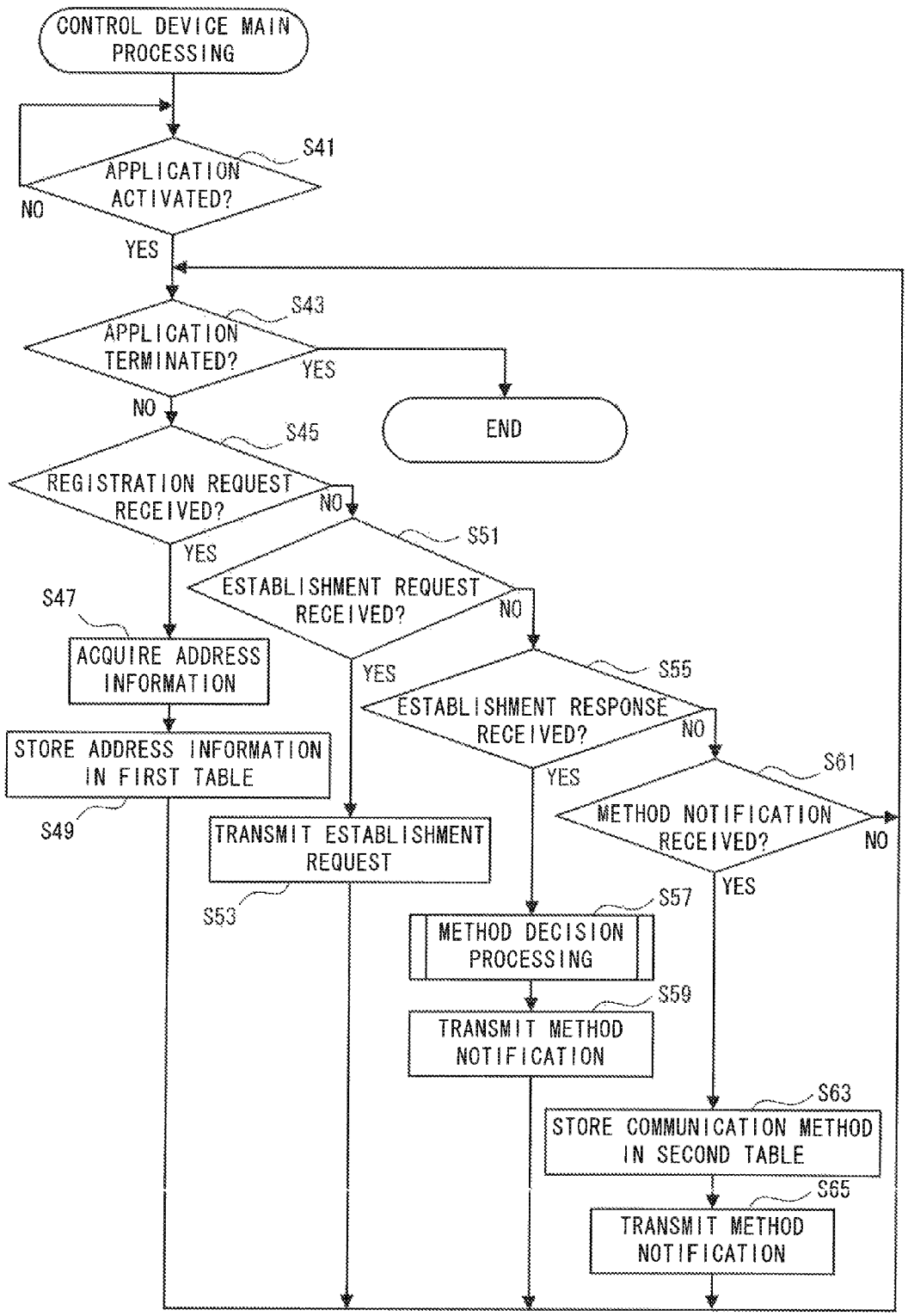
FIG. 11 is a flowchart showing control device main processing.

The communication control device 8 receives, via the relay device 5, the registration request transmitted from the communication device 10 (step S45, refer to FIG. 11), and stores the address information in the first table 241 (step S49, refer to FIG. 11). As a result, the communication device 10 is able to establish a session with the other communication device 10 by transmitting the establishment request (refer to step S19, which will be described later) to the communication control device 8.

The CPU 31 determines whether a command that terminates the application activated at step Sli has been input via the input portion 36 (step S15). When the command that terminates the application has been input (yes at step S15), the CPU 31 ends the communication device main processing.

In a case where the command that terminates the application has not input (no at step S15), the CPU 31 determines whether a command that starts communication with the other communication device 10 has been input via the input portion 36 (step S17). In a case where the command that starts communication with the other communication device 10 has been input via the input portion 36 (yes at step S17), the CPU 31 transmits the establishment request to the communication control device 8 via the relay device 5 in order to establish a session with the other communication device 10 (step S19) (S201, S221, S241, refer to FIG. 6). The CPU 31 returns the processing to step S15.

The communication control device 8 receives, via the relay device 5, the establishment request transmitted from the communication device 10 (step S51, refer to FIG. 11) (S203, S223, S243, refer to FIG. 6). The communication control device 8 transmits the establishment request to the other communication device 10 that is requested to start communication (step S53, refer to FIG. 11) (S205, S225, S245, refer to FIG. 6).

In a case where the command that starts communication with the other communication device 10 has not been input via the input portion 36 (no at step S17), the CPU 31 determines whether the establishment request transmitted from the communication control device 8 has been received via the relay device 5 (step S21). In a case where the establishment request has been received via the relay device 5 (yes at step S21) (S207, S227, S247, refer to FIG. 6), the CPU 31 notifies the communication device 10 that the session establishment is requested from the other communication device 10. In a case where a command that permits the session establishment is accepted, the CPU 31 transmits the establishment response to the communication control device 8 via the relay device 5 (step S23) (S209, S229, S249, refer to FIG. 6).

The communication control device 8 receives, via the relay device 5, the establishment response transmitted from the communication device 10 (step S55, refer to FIG. 11) (S211, S231, S251, refer to FIG. 6). The communication control device 8 refers to the first table 241 (refer to FIG. 5), and thereby decides the communication method between the communication devices 10 (step S57, refer to FIG. 11). The communication control device 8 transmits the method notification, which notifies the decided communication method, to the communication device 10 that has transmitted the establishment request and to the communication device 10 that has transmitted the establishment response, via the relay device 5 (step S59, refer to FIG. 11) (S213, S215, S233, S235, S253, S255, refer to FIG. 6).

In a case where the establishment request has not been received via the relay device 5 (no at step S21), the CPU 31 determines whether the method notification transmitted from the communication control device 8 has been received via the relay device 5 (step S25). In a case where the method notification has been received via the relay device 5 (yes at step S25), the CPU 31 establishes a session with the other communication device 10 based on the communication method notified by the received method notification (step S27) (S217, S237, S257, refer to FIG. 6). The CPU 31 associates the ID that identifies the communication device 10 with the ID of the other communication device 10 with which the session has been established, and with the communication method of the established session, and transmits the associated information to the communication control device 8, as session information. The CPU 21 of the communication control device 8 stores the session information in the RAM 23.

In a case where the P2P communication method is decided as the communication method to be used for communication with the other communication device 10, the CPU 31 determines whether the session is successfully established to perform P2P communication (step S29). Whether the session is successfully established may be determined in the following manner, for example. The communication device 10 transmits the ID of the communication device 10 to the communication control device 8. The communication control device 8 receives the ID of the communication device 10 from the communication device 10, and transmits the received ID to the other communication device 10. The other communication device 10 receives the ID of the communication device 10 from the communication control device 8. The other communication device 10 transmits, to the communication control device 8, the received ID of the communication device 10, information indicating whether the session establishment by the P2P communication is possible, and the ID of the other communication device 10. The communication control device 8 receives the ID of the communication device 10, the information indicating whether the session establishment by the P2P communication is possible, and the ID of the other communication device 10. The communication control device 8 stores the information indicating whether the session establishment by the P2P communication is possible, in association with the received ID of the communication device 10 and the ID of the other communication device 10, among the session information stored in the RAM 23. The communication control device 8 transmits, to the communication device 10, the ID of the other communication device 10 and the information indicating whether the session establishment by the P2P communication is possible. The communication device 10 receives the information indicating whether the session establishment by the P2P communication is possible, and the ID of the other communication device 10. In a case where the communication device 10 receives information indicating that the session by the P2P communication is possible, the communication device 10 determines that the session by the P2P communication (the P2P session) is successfully established. On the other hand, in a case where the communication device 10 receives information indicating that the session by the P2P communication is not possible, the communication device 10 determines that establishment of the session by the P2P communication has failed. In a case where the session is successfully established to perform the P2P communication with the other communication device 10 (yes at step S29), the CPU 31 uses the established session to start communication with the other communication device 10. The CPU 31 returns the processing to step S15.

On the other hand, for example, in a case where the other communication device 10 is not compatible with the P2P communication method, the CPU 31 cannot establish the session with the other communication device 10 in order to perform P2P communication (no at step S29). In this case, in order to change the communication method from the P2P communication method to the C/S communication method, the CPU 31 transmits the method notification that notifies the C/S communication method to the communication control device 8 via the relay device 5 (step S31). The CPU 31 returns the processing to step S15. In a case where the method notification has not been received (no at step S25), the CPU 31 returns the processing to step S15.

The communication control device 8 receives, via the relay device 5, the method notification transmitted from the communication device 10 (step S61, refer to FIG. 11). The communication control device 8 transmits the method notification to the other communication device 10 that has failed to establish the session with the communication device 10, via the relay device 5 (step S65, refer to FIG. 11).

Control device main processing that is performed by the CPU 21 of the communication control device 8 will be explained with reference to FIG. 11. The control device main processing is performed by the CPU 21 of the communication control device 8, in accordance with the program stored in the HDD 24. When a power supply of the communication control device 8 is turned ON, the CPU 21 starts the control device main processing.

When the control device main processing is started, the CPU 21 determines whether a command that activates an application to control the communication method between the communication devices 10 has been accepted (step S41). In a case where the command that activates the application has not been accepted (no at step S41), the CPU 21 returns the processing to step S41. In a case where the command that activates the application has been accepted (yes at step S41), the CPU 21 determines whether a command that terminates the application activated at step S41 has been accepted (step S43). In a case where the command that terminates the application has been accepted (yes at step S43), the CPU 21 ends the control device main processing. Note that the activation command at step S41 is transmitted, for example, from an input portion (not shown in the drawings) of the communication control device 8, or from the communication device 10 via the network 4. The termination command at step S43 may be transmitted in the same manner.

In a case where the command that terminates the application has not been accepted (no at step S43), the CPU 21 determines whether the registration request has been received from the communication device 10 via the relay device 5 (step S45). In a case where the registration request has been received via the relay device 5 (yes at step S45), the CPU 21 acquires the address information (step S47). Specifically, the CPU 21 acquires a transmission source IP address of the registration request, as the global IP address corresponding to the communication device 10 that has transmitted the registration request. The CPU 21 acquires the local IP address and the local network address included in the registration request, as the local IP address and the local network address corresponding to the communication device 10 that has transmitted the registration request. The CPU 21 associates the acquired address information with the ID of the communication device 10 that has transmitted the registration request, and stores the associated address information and the ID in the first table 241 (step S49). The CPU 21 returns the processing to step S43.

In a case where the registration request has not been received via the relay device 5 (no at step S45), the CPU 21 determines whether the establishment request transmitted from the communication device 10 has been received via the relay device 5 (step S51). In a case where the establishment request has been received from the relay device 5 (yes at step S51) (S203, S223, S243, refer to FIG. 6), the CPU 21 transmits the establishment request received from the communication device 10 to the other communication device 10 that is a communication counterpart of the communication device 10 that has transmitted the establishment request, via the relay device 5 (step S53) (S205, S225, S245, refer to FIG. 6). The CPU 21 returns the processing to step S43.

In a case where it is determined that the establishment request has not been received via the relay device 5 (no at step S51), the CPU 21 determines whether the establishment response transmitted from the communication device 10 in response to the establishment request transmitted at step S53 has been received via the relay device 5 (step S55). In a case where the establishment response has been received from the communication device 10 via the relay device 5 (yes at step S55) (S211, S231, S251, refer to FIG. 6), the CPU 21 performs method decision processing (step S57). The method decision processing is processing that decides the communication method between the communication devices 10.

Figure 12:
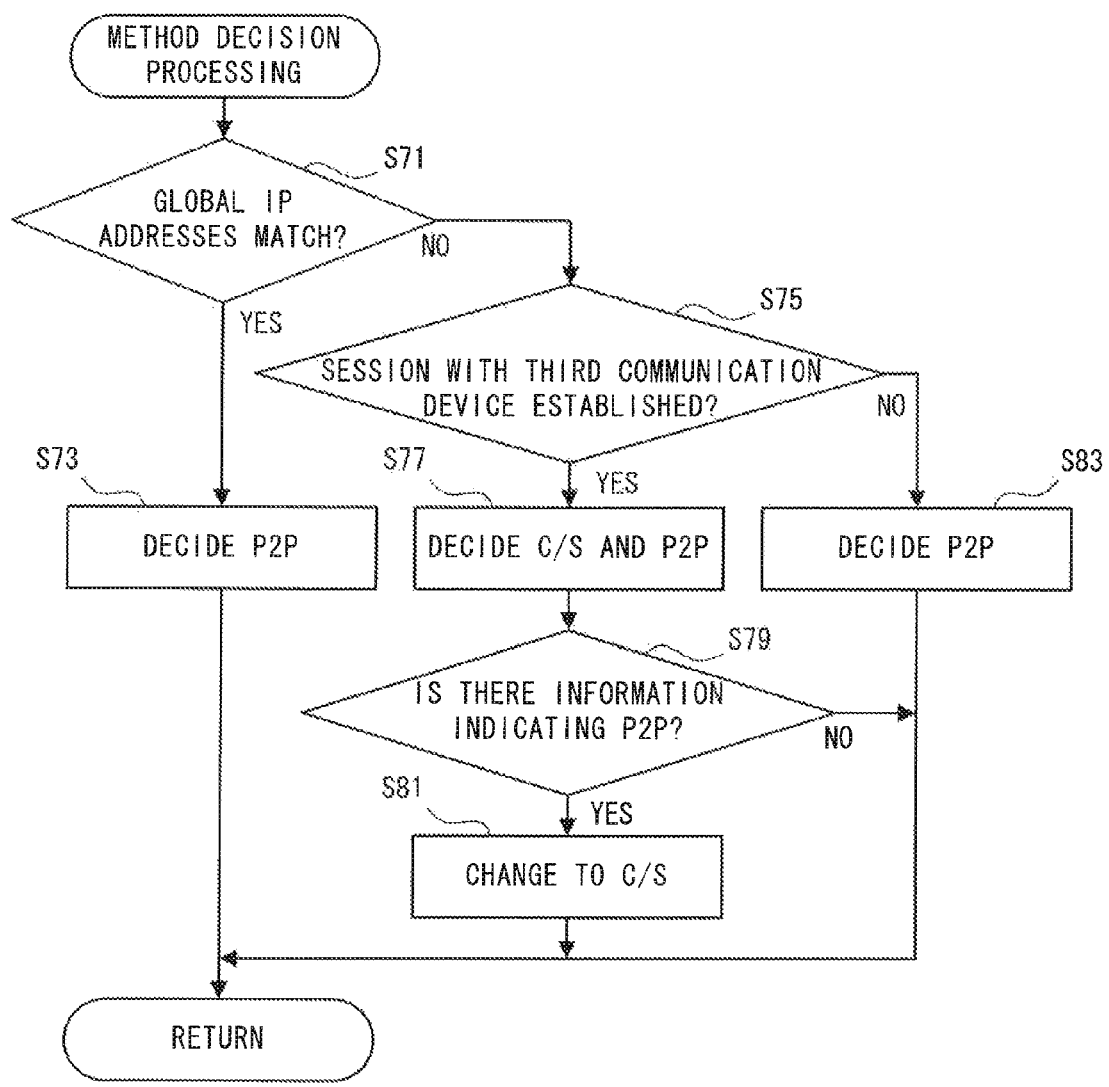
FIG. 12 is a flowchart showing method decision processing.

The method decision processing will be explained with reference to FIG. 12. Hereinafter, the communication device 10 that has transmitted the establishment request to another one of the communication devices 10 is referred to as the first communication device. The communication device 10 that has received the establishment request from the other communication device 10 is referred to as the second communication device. The communication device 10 that is other than the second communication device and that is connected to the LAN 9 different from the LAN 9 to which the first communication device is connected is referred to as the third communication device.

The CPU 21 refers to the first table 241 (refer to FIG. 5). The CPU 21 determines whether the global IP address associated with the ID of the first communication device matches the global IP address associated with the ID of the second communication device (step S71). In a case where the global IP addresses match each other (yes at step S71), the CPU 21 determines that the first communication device and the second communication device are connected to the same LAN 9. In this case, the above-described criterion (1) is satisfied. The CPU 21 decides the P2P communication method as the communication method (the first communication method) to be used for communication from the first communication device to the second communication device, and from the second communication device to the first communication device (step S73). Information indicating that the communication method (the first communication method) to be used for communication from the first communication device to the second communication device, and from the second communication device to the first communication device is the P2P communication method is stored in the second table 242. The method decision processing ends and the CPU 21 returns the processing to the control device main processing (refer to FIG. 11).

On the other hand, in a case where the global IP address associated with the ID of the first communication device differs from the global IP address associated with the ID of the second communication device (no at step S71), the CPU 21 determines that the first communication device and the second communication device are connected to the different LANs 9. Next, the CPU 21 refers to the session information received from the communication device 10 and stored in the RAM 23 at step S27 (FIG. 10), and thereby determines whether the third communication device is connected to the LAN 9 different from the LAN 9 to which the first communication device is connected and whether the session between the first communication device and the third communication device has been established (step S75). Note that, in a case where the session between the first communication device and the third communication device has been established, the CPU 21 also determines the communication method of the session by referring to the session information. In a case where the session between the first communication device and the third communication device has been established (yes at step S75), the above-described criteria (2-1) and (2-2) are satisfied. Therefore, the CPU 21 decides the C/S communication method as the communication method (the second communication method) to be used for communication from the first communication device to the second communication device, and from the first communication device to the third communication device (2-1) (step S77). The CPU 21 stores, in the second table 242, information indicating that the communication method to be used for communication from the first communication device to the second communication device is the C/S communication method. Further, in a case where the information indicating the communication method to be used for communication from the first communication device to the third communication device has not been stored in the second table 242, the CPU 21 stores, in the second table 242, information indicating that the communication method to be used for communication from the first communication device to the third communication device is the C/S communication method. Note that processing that is performed when the information indicating the communication method to be used for communication from the first communication device to the third communication device has been stored in the second table 242 will be described later.

Further, the CPU 21 decides the P2P communication method as the communication method to be used for communication from the second communication device to the first communication device (2-2) (step S77). The CPU 21 stores, in the second table 242, information indicating that the communication method to be used for communication from the second communication device to the first communication device is the P2P communication method.

In a case where the session between the first communication device and the third communication device has already been established, the communication method to be used for communication from the first communication device to the third communication device has already been decided as the third communication method. Therefore, there is a case in which the communication method (the second communication method, the C/S communication method) decided at step S77 to be used for communication from the first communication device to the third communication device is different from the third communication method. In this case, the CPU 21 changes the third communication method to the second communication method (the C/S communication method) decided at step S77. Specifically, the communication method may be changed in the following manner. The CPU 21 refers to the second table 242. The CPU 21 determines whether the information indicating the communication method to be used for communication from the first communication device to the third communication device is the information indicating the P2P communication method (step S79). In a case where the information indicating the P2P communication method is included (yes at step S79), the CPU 21 changes the information indicating the P2P communication method to the information indicating the C/S communication method (step S81). The communication method to be used for communication from the first communication device to the third communication device may be changed from the third communication method to the second communication method. The CPU 21 ends the method decision processing, and returns the processing to the control device main processing (refer to FIG. 11).

In a case where the information indicating the communication method to be used for communication from the first communication device to the third communication device is the information indicating the communication method other than the P2P communication method (no at step S79), the CPU 21 ends the method decision processing without changing the content of the second table 242 to the information indicating the C/S communication method. The CPU 21 returns the processing to the control device main processing (refer to FIG. 11). In a case where the third communication device is not connected to the LAN 9 that is different from the LAN 9 to which the first communication device is connected, or in a case where the session has not been established between the first communication device and the third communication device (no at step S75), the above-described criterion (3) is satisfied. The CPU 21 decides the P2P communication method as the communication method to be used for communication from the first communication device to the second communication device, and as the communication method to be used for communication from the second communication device to the first communication device (the fourth communication method) (step S83). The CPU 21 stores, in the second table 242, information indicating that the communication method to be used for communication from the first communication device to the second communication device and the communication method to be used for communication from the second communication device to the first communication device are the P2P communication method.

As shown in FIG. 11, after the communication method is decided by the method decision processing (step S57), the CPU 21 transmits, to the communication device 10 for which the communication method is changed, the method notification that notifies the decided communication method, via the relay device 5 (step S59) (S213, S215, S233, S235, S253, S255, refer to FIG. 6). The CPU 21 returns the processing to step S43.

In a case where the establishment response has not been received (no at step S55), the CPU 21 determines whether the method notification transmitted from the communication device 10 has been received (step S61). In a case where the method notification has been received (yes at step S61), the CPU 21 stores the communication method notified by the method notification from the communication device 10, in the second table 242 (step S63). In a case where the session cannot be established by the P2P communication method, the communication device 10 transmits the method notification in order to switch the communication method to the C/S communication method (step S31, refer to FIG. 10). Therefore, among the communication methods stored in the second table 242, the CPU 21 may change the communication method to be used between the communication device 10 that has transmitted the method notification and the other communication device 10 that has failed to establish the session with the communication device 10 that has transmitted the method notification, from the P2P communication method to the C/S communication method.

The CPU 21 transmits, via the relay device 5, the method notification to the other communication device 10 that has failed to establish the session with the communication device 10 that has transmitted the method notification (step S65). Note that the CPU 21 refers to the information stored in the RAM 23 as the session information, and thereby identifies the ID of the other communication device 10 that is associated with the ID of the communication device 10 that has transmitted the method notification. The identified ID of the other communication device 10 is associated with information indicating that the session establishment by the P2P communication is not possible. The CPU 21 can identify the communication device 10 with the identified ID as the other communication device 10 that has failed to establish the session by the P2P communication. Therefore, the CPU 21 can transmit the method notification to the other communication device 10 that has failed to establish the session with the communication device 10 that has transmitted the method notification. The CPU 21 returns the processing to step S43. In a case where the method notification has not been received (no at step S61), the CPU 21 returns the processing to step S43.

As described above, the communication control device 8 may decide, for each of the communication channels, the communication method that can reduce the total number of times that the relay device 5 relays data, based on the relation between each of the LANs 9 to which each of the communication devices 10 is connected, and notify the decided communication method to each of the communication devices 10. Each of the communication devices 10 may establish a session with the other communication device 10 based on the notified communication method and performs communication. As a result of this, the communication control device 8 can reduce the amount of data relayed by the relay device 5 during communication.

Further, the communication control device 8 can switch the communication method depending on whether the LAN 9 to which the first communication device is connected and the LAN 9 to which the second communication device is connected are the same or different from each other. Further, the communication control device 8 can switch the communication method depending on whether the third communication device that has established the session with the first communication device is connected to the LAN 9 other than the LAN 9 to which the first communication device is connected. In this manner, the communication control device 8 may switch the communication method. As a result of this, the communication control device 8 can decide the communication method such that the total number of times that the relay device 5 relays data is reduced, and thus the amount of data relayed by the relay device 5 is reduced. Thus, the reliability of the communication between the communication devices 10 is further improved.

Further, the communication control device 8 can acquire information of the LAN 9 to which the communication device 10 is connected, based on the address information of the communication device 10.

Particularly, the communication control device 8 can decide the communication method that is used when communication is performed between three or more of the communication devices 10, based on the criteria (1), (2-1), (2-2) and (3). Therefore, even when the connection state between the communication devices 10 is complicated, the communication control device 8 can decide the communication method for each of the communication channels to reduce the number of times that the relay device 5 relays data. Moreover, generally, in a case where communication is performed between the communication devices 10, in many cases, interactive communication is performed based on a common communication method. In contrast to this, the communication control device 8 may decide the communication method that is used for each of the communication channels in a case where communication is performed between the communication devices 10. Therefore, the total number of times that the relay device 5 relays data may be reduced by performing communication between the communication devices 10 based on the communication method decided by the communication control device 8.

Note that the present disclosure is not limited to the above-described embodiment, and various modifications are possible. The above-described embodiment is an example in which the communication control device 8 decides the communication method between the communication devices 10, and the communication device 10 establishes a session and performs communication with another one of the communication devices 10 based on the communication method notified by the method notification received from the communication control device 8. However, the communication device 10 may decide the communication method and may communicate with another one of the communication devices 10 based on the decided communication method. Hereinafter, a modified example of the present disclosure will be explained with reference to FIG. 13 to FIG. 15. Note that, in the modified example, the communication device 10 that has transmitted the establishment request decides the communication method, and notifies the communication method to the other communication device 10, which is a communication counterpart of the communication device 10 that has transmitted the establishment request. In the modified example, the second table 242 (refer to FIG. 7 to FIG. 9) is stored in the HDD 34 of the communication device 10.

Figure 13:
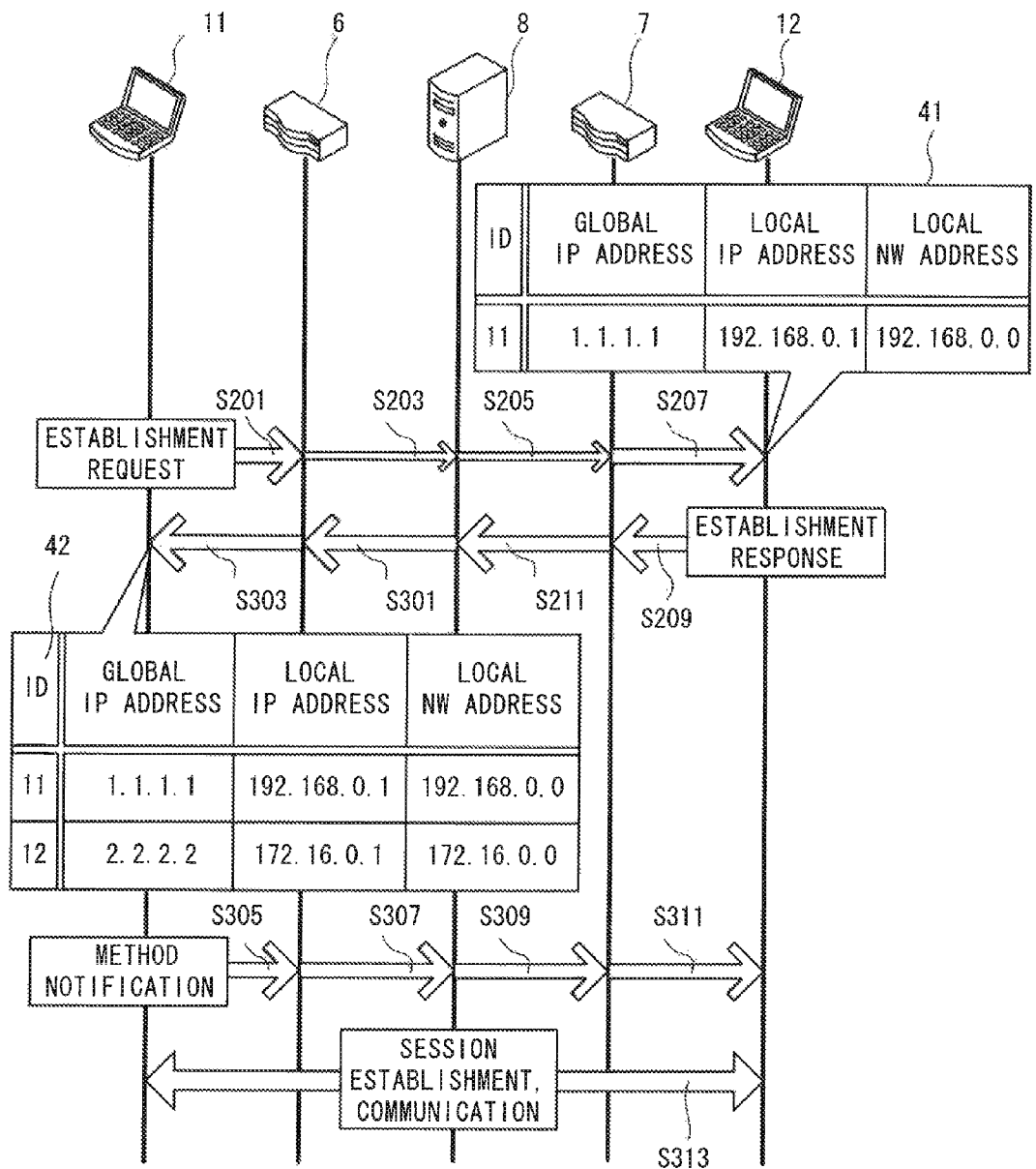
FIG. 13 is a diagram showing a communication sequence according to a modified example.

A communication sequence according to the modified example, which is performed in a case where communication is started between the communication devices 11 and 12, will be explained with reference to FIG. 13. Communication steps that are the same as those in the communication sequence (refer to FIG. 6) of the above-described embodiment are denoted with the same reference numerals and an explanation thereof is omitted here. Note that the same communication is also performed between the communication devices 11 and 13 and between the communication devices 12 and 13, and communication is started. The communication between the communication devices 11 and 13 and between the communication devices 12 and 13 is omitted in FIG. 13. When the communication device 11 transmits the establishment request to the communication device 12, the communication device 11 adds, to the establishment request, the ID "11", the local IP address of the communication device 11, and the local network address of the LAN 2 to which the communication device 11 is connected. The communication device 11 transmits the establishment request to the communication control device 8 via the relay device 6 (S201), and the communication control device 8 receives the establishment request via the relay device 6 (S203).

When the communication control device 8 receives the establishment request from the communication device 11 via the relay device 6, the communication control device 8 acquires a transmission source IP address of the received establishment request. Note that the acquired transmission source IP address corresponds to the global IP address that is set for the WAN side port of the relay device 6. The communication control device 8 associates the acquired transmission source IP address as a first global IP address with the ID "11", and adds the first global IP address to the establishment request. The communication control device 8 transmits the establishment request to the communication device 12 via the relay device 7 (S205). The communication device 12 receives the establishment request via the relay device 7 (S207). Address information 41 (the first global IP address, the local IP address and the local network address) of the communication device 11 has been added to the establishment request received by the communication device 12.

In a case where the communication device 12 permits the session establishment, the communication device 12 adds, to the establishment response, the address information 41 that has been added to the establishment request and that is associated with the ID "11", the ID "12", the local IP address of the communication device 12, and the local network address of the LAN 3 to which the communication device 12 is connected. The communication device 12 transmits the establishment response to the communication control device 8 via the relay device 7 (S209), and the communication control device 8 receives the establishment response via the relay device 7 (S211).

In a case where the communication control device 8 receives the establishment response from the communication device 12 via the relay device 7, the communication control device 8 acquires a transmission source IP address of the received establishment response. Note that the acquired transmission source IP address corresponds to the global IP address that is set for the WAN side port of the relay device 7. The communication control device 8 associates the acquired transmission source IP address as a second global IP address with the ID "12", and adds the second global IP address to the establishment response. The communication control device 8 transmits the establishment response to the communication device 11 via the relay device 6 (S301). The communication device 11 receives the establishment response via the relay device 6 (S303). Address information 42 has been added to the establishment response received by the communication device 11. The address information 42 includes the global IP address, the local IP address and the local network address of each of the communication device 11 and the communication device 12. The communication device 11 stores the address information 42 in a third table (not shown in the drawings). The third table is a table that may be used to manage address information of the communication devices 10 in the same manner as the first table 241 of the present embodiment. The third table may be stored in the HDD 34 of the communication device 10.

The communication device 11 decides the communication method between the communication devices 11 and 12 based on the address information 42. The communication device 11 determines whether the LAN 2 connected to the communication device 11 (corresponding to the first communication device) that has requested the session establishment is the same as the LAN 3 connected to the communication device 12 (corresponding to the second communication device) with which the session is requested to be established. This determination may be made based on whether the first global IP address associated with the ID "11" and the second global IP address associated with the ID "12" match each other in the address information 42. In the address information 42, the global IP addresses associated with the ID "11" and the ID "12" are different from each other. The communication device 11 determines that the LAN 2 to which the communication device 11 is connected is different from the LAN 3 to which the communication device 12 is connected.

Next, the communication device 11 determines whether another one of the communication devices 10 (corresponding to the third communication device) that is other than the communication device 12 is connected to the LAN 9 other than the LAN 2 to which the communication device 11 is connected. This determination may be made based on whether the global IP address that is different from the global IP address corresponding to the ID "11" is associated with the ID of the communication device 10 other than the communication device 12 in the third table. In the modified example, address information of the communication device 10 other than the communication devices 11 and 12 has not been stored in the third table. In the address information 42, the global IP address 2.2.2.2, which is different from the global IP address 1.1.1.1 associated with the ID "11", is associated only with the ID "12". This means that the communication device 10 other than the communication device 12 is not connected to the LAN 9 that is different from the LAN 2 to which the communication device 11 is connected.

The above result satisfies the above-described criterion (3). Therefore, the communication device 11 decides the P2P communication method as the communication method to be used for communication from the communication device 11 to the communication device 12, and as the communication method to be used for communication from the communication device 12 to the communication device 11 (the fourth communication method). The communication device 11 stores, in the second table 242, information indicating that both the communication method to be used for communication from the communication device 11 to the communication device 12, and the communication method to be used for communication from the communication device 12 to the communication device 11 are the P2P communication method. Note that the decided communication method is the same as the communication method decided by the communication control device 8 in the above-described embodiment.

Next, the communication device 11 transmits the method notification, which notifies the decided communication method to the communication device 12, to the communication control device 8 via the relay device 6 (S305). The communication control device 8 receives the method notification via the relay device 6 (S307). The communication control device 8 transmits the method notification to the communication device 12 via the relay device 7 (S309). The communication device 12 receives the method notification via the relay device 7 (S311). Based on the received method notification, the communication device 12 recognizes that the decided communication method is the P2P communication method. The communication device 12 stores, in the second table 242, information indicating that both the communication method to be used for communication from the communication device 11 to the communication device 12, and the communication method to be used for communication from the communication device 12 to the communication device 11 are the P2P communication method.

The communication devices 11 and 12 identify the communication method (the P2P communication method) by referring to the second table 242, and establish a session to start P2P communication. The communication devices 11 and 12 are able to perform P2P communication (S313). Therefore, the communication from the communication device 11 to the communication device 12 and the communication from the communication device 12 to the communication device 11 are performed based on the P2P communication method.

Figure 14:
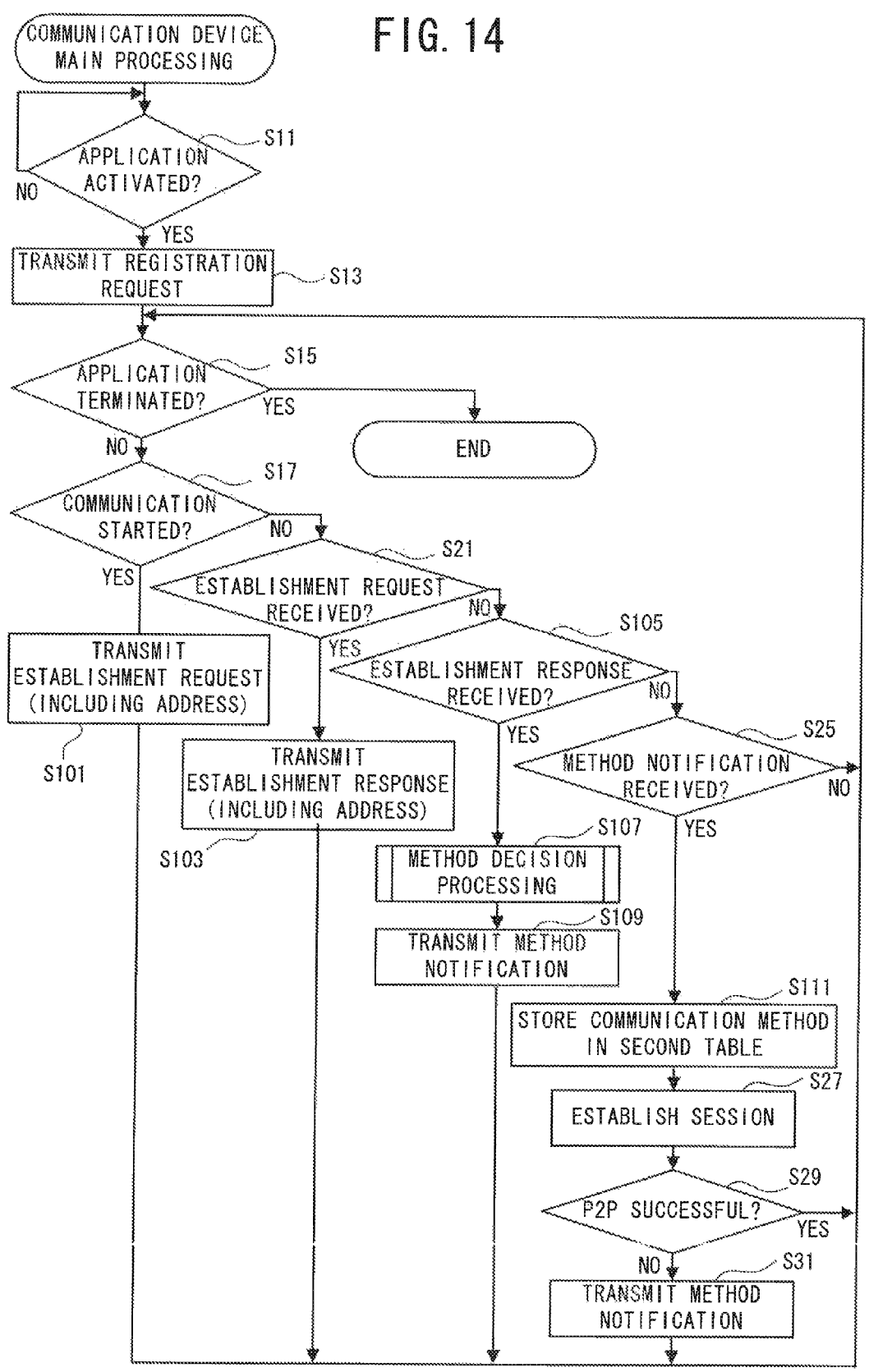
FIG. 14 is a flowchart showing communication device main processing according to the modified example.

Communication device main processing according to the modified example, which is performed by the CPU 31 of the communication device 10, will be explained with reference to FIG. 14. Processing steps that are the same as those of the communication device main processing shown in FIG. 10 are denoted with the same reference numerals and an explanation thereof is omitted here.

When a command that starts communication with the other communication device 10 is input via the input portion 36 (yes at step S17), the CPU 31 transmits the establishment request to establish a session with the other communication device 10, to the communication control device 8 via the relay device 5 (step S101). The ID, the local IP address and the local network address of the communication device 10 are added to the establishment request. After the establishment request is transmitted, the CPU 31 returns the processing to step S15.

In a case where the CPU 31 receives the establishment request from the communication control device 8 via the relay device 5 (no at step S17, yes at step S21), and the CPU 31 accepts a command that permits the session establishment, the CPU 31 transmits the establishment response to the communication control device 8 via the relay device 5 (step S103). The address information 41 (refer to FIG. 13) added to the establishment request, and the ID, the local IP address and the local network address of the communication device 10 are added to the establishment response. After the establishment response is transmitted, the CPU 31 returns the processing to step S15.

In a case where the CPU 31 receives the establishment response from the communication control device 8 via the relay device 5 (no at step S21, yes at step S105), the CPU 31 performs the method decision processing (refer to FIG. 12) based on the address information 42 (refer to FIG. 13) added to the establishment response (step S107). The method decision processing is the same as that of the above-described embodiment. After the CPU 31 decides the communication method to be used between the communication devices 10, the CPU 31 transmits the method notification that notifies the decided communication method to the communication control device 8 via the relay device 5 (step S109). The CPU 31 returns the processing to step S15.

In a case where the CPU 31 receives the method notification from the communication control device 8 via the relay device 5 (no at step S105, yes at step S25), the CPU 31 stores the communication method notified by the received method notification in the second table 242 (step S111). The CPU 31 establishes a session with the other communication device 10 based on the communication method notified by the received method notification (step S27), and starts communication.

Figure 15:
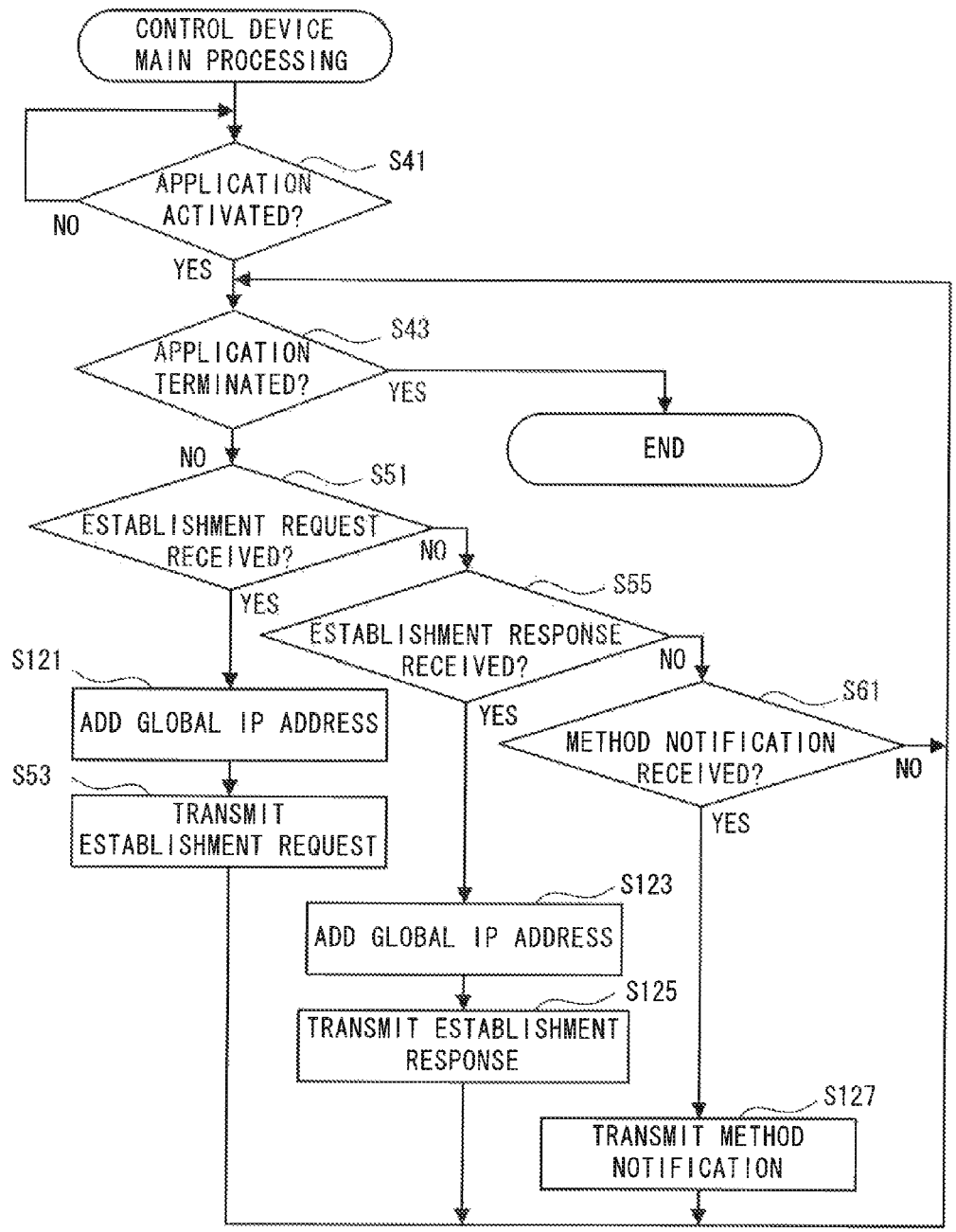
FIG. 15 is a flowchart showing control device main processing according to the modified example.

Control device main processing according to the modified example, which is performed by the CPU 21 of the communication control device 8, will be explained with reference to FIG. 15. Processing that are the same as those of the control device main processing shown in FIG. 11 are denoted with the same reference numerals and an explanation thereof is omitted here.

In a case where the CPU 21 receives the establishment request from the communication device 10 via the relay device 5 (yes at step S51), the CPU 21 acquires a transmission source IP address of the establishment request as the first global IP address that corresponds to the communication device 10 that has transmitted the establishment request. The CPU 21 associates the acquired first global IP address with the ID of the communication device 10 that has transmitted the establishment request, and adds the acquired first global IP address to the establishment request (step S121). The CPU 21 transmits the establishment request to the communication device 10 that is requested to start communication, via the relay device 5 (step S53). The CPU 21 returns the processing to step S43.

In a case where the CPU 21 receives the establishment response from the communication device 10 via the relay device 5 (no at step S51, yes at step S55), the CPU 21 acquires a transmission source IP address of the establishment response as the second global IP address corresponding to the communication device 10 that has transmitted the establishment response. The CPU 21 associates the acquired second global IP address with the ID of the communication device 10 that has transmitted the establishment response, and adds the acquired second global IP address to the establishment response (step S123). The CPU 21 transmits the establishment response to the communication device 10 that has transmitted the establishment request, via the relay device 5 (step S125). The CPU 21 returns the processing to step S43.

In a case where the CPU 21 receives the method notification transmitted from the communication device 10 (no at step S55, yes at step S61), the CPU 21 transmits the method notification to the communication device 10 that is a communication counterpart of the communication device 10 that has transmitted the method notification, via the relay device 5 (step S127). The CPU 21 returns the processing to step S43.

As explained above, in the modified example, since the communication device 10 decides the communication method, it is not necessary for the communication control device 8 to perform the processing that decides the communication method. Therefore, even when a known server or the like that does not have a function to decide the communication method is used, the communication device 10 can appropriately decide the communication method and establish a session with the other communication device 10 to start communication.

In the above-described embodiment, the CPU 21 of the communication control device 8 identifies the LAN to which the communication device 10 is connected, based on the global IP address stored in the first table 241. In contrast to this, the CPU 21 may identify the LAN to which the communication device 10 is connected, based on the local network address stored in the first table 241. Further, the CPU 21 may identify the LAN to which the communication device 10 is connected, based on both the global IP address and the local network address. By doing this, the CPU 21 can appropriately identify the LAN to which the communication device 10 is connected. Note that also in the modified example, the LAN to which the communication device 10 is connected may be identified based on the local network address included in the address information 42.

The LAN to which the communication device 10 is connected may be identified based on information other than the address information. For example, the LAN to which the communication device 10 is connected may be identified by identifying the relay devices 5 based on information other than the global IP address, and by determining whether the relay devices 5 are the same or different from each other.

In the above-described embodiment and the modified example, the communication method that can be used by the communication device 10 is not limited to the P2P communication method and the C/S communication method. The criteria (1) to (3) for deciding the communication method in the above-described embodiment and the modified example are only an example, and the communication method may be decided based on other criteria. The communication method that is decided when one of the criterion (2-2) and the criterion (3) is satisfied may be the C/S communication method instead of the P2P communication method. In a case where C/S communication is performed, a device having a server function is not limited to the communication control device 8. The communication system 1 may have a separate server that may be used when C/S communication is performed.

In the above-described embodiment and the modified example, when the communication control device 8 receives the registration request transmitted from the communication device 10, the CPU 21 of the communication control device 8 creates the first table 241 (refer to FIG. 5). Alternatively, when the communication control device 8 receives the establishment request and the establishment response transmitted from the communication device 10, the CPU 21 may create the first table 241 such that the CPU 21 acquires the address information from the establishment request and the establishment response and stores the address information in the first table 241. In this case, it is sufficient if the local IP address and the local network address have been added to the establishment request and the establishment response.

In the above-described modified example, both the communication device 10 that has transmitted the establishment request and the communication device 10 that has received the establishment request may decide the communication method. In this case, the communication control device 8 may transmit the address information 42 (refer to FIG. 13) to both the communication device 10 that has transmitted the establishment request and the communication device 10 that has received the establishment request.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:
1. A system comprising:
   a communication control device configured to be connectable to an external network;
   a first communication device configured to be connectable to a first internal network, the first internal network being connected to the external network;
   a second communication device configured to be connectable to a second internal network, the second internal network being connected to the external network; and
   a third communication device configured to be connectable to a third internal network, the third internal network being connected to the external network and being different from the first internal network, wherein:
   the communication control device comprises:
      a processor; and
      a memory storing computer-readable instructions that, when executed by the processor of the communication control device, cause the communication control device to:
         acquire first network information that identifies the first internal network, and second network information that identifies the second internal network;
         determine whether the first internal network and the second internal network are the same, based on the acquired first network information and the second network information;

in a case where the first internal network and the second internal network are the same:

determine a first method of transmission from the first communication device to the second communication device, and of transmission from the second communication device to the first communication device; and send first information indicating the first method to the first communication device and the second communication device; and in a case where the first internal network and the second internal network are different:

determine whether a session has been established between the first communication device and the third communication device;

determine, based on a result of the determining whether the session has been established between the first and third communication devices, a second method of transmission from the first communication device to the second communication device and to the third communication device, wherein the first method of transmission and the second method of transmission each correspond to one of a client-server communication method and a peer-to-peer communication method; and send second information indicating the second method to the first communication device the first communication device comprises:

a processor; and a memory storing computer-readable instructions that, when executed by the processor of the first communication device, cause the first communication device to:

send first network information to the communication control device;

change a third method to the second method in a case where the session has been established between the first communication device and the third communication device, the third method indicating a method for communication in the established session before the second information indicating the second method has been received by the first communication device;

receive at least one of: the first information indicating the first method sent from the communication control device and the second information indicating the second method sent from the communication control device;

communicate with the second communication device using the first method, based on the received first information indicating the first method;

communicate with the second communication device using the second method, based on the received second information indicating the second method; and communicate with the third communication device, based on the received second information indicating the second method, and the second communication device comprises:

a processor; and a memory storing computer-readable instructions that, when executed by the processor of the second communication device, causes the second communication device to:

send the second network information to the communication control device;

receive the information indicating the first method sent from the communication control device; and communicate with the first communication device using the first method, based on the received information indicating the first method.

2. The system according to claim 1, wherein:

the first method includes a peer to peer communication method in a case where it is determined that the first internal network and the second internal network are the same.

3. The system according to claim 1, wherein:

the second method includes the client-server communication method in a case where it is determined that the first internal network is different from the second internal network and that the session has been established between the first communication device and the third communication device.

4. The system according to claim 1, wherein the computer-readable instructions stored in the memory of the communication control device further cause the communication control device to:

determine a fourth method as a method of communication from the first communication device to the second communication device and of communication from the second communication device to the first communication device in a case where it is determined that the first internal network is different from the second internal network and that the session has not been established between the first communication device and the third communication device, the fourth method being a predetermined method that is one of the peer to peer communication method and the client-server communication method, send third information indicating the fourth method to the first communication device and the second communication device, wherein the instructions stored in the memory of the first communication device further cause the first communication device to:

receive the third information indicating the fourth method sent from the communication control device; and communicate with the second communication device using the fourth method, based on the received third information indicating the fourth method, and wherein the instructions stored in the memory of the second communication device further cause the second communication device to:

receive the third information indicating the fourth method from the communication control device; and communicate with the first communication device using the fourth method, based on the received third information indicating the fourth method.

5. The system according to claim 1, wherein the acquiring by the communication control device further comprises:

acquiring, as the first network information, first address information that is associated with a first port of a first relay device, the first relay device including the first port and a second port, the first port being connected to the external network, and the second port being connected to the first internal network; and acquiring, as the second network information, second address information that is associated with a third port of a second relay device, the second relay device including the third port and a fourth port, the third port being connected to the external network, and the fourth port being connected to the second internal network.

6. A non-transitory computer-readable medium storing computer-readable instructions that, when executed by a processor of a communication control device connectable to an external network, cause the communication control device:

acquire first network information that identifies a first internal network, and second network information that identifies a second internal network, the first internal network being connected to the external network, and the second internal network being connected to the external network;

determine whether the first internal network and the second internal network are the same, based on the acquired first network information and the second network information;

in a case where the first internal network and the second internal network are the same:
  determine a first method of transmission from a first communication device to a second communication device, and of transmission from the second communication device to the first communication device; and
  send first information indicating the first method to the first communication device and the second communication device; and in a case where the first internal network and the second internal network are different:
  determine whether a session has been established between the first communication device and a third communication device;
  determine, based on a result of the determining whether the session has been established between the first and third communication devices, a second method of transmission from the first communication device to the second communication device and to the third communication device, the first communication device being configured to be connectable to the first internal network, the second communication device being configured to be connectable to the second internal network, and the third communication device being configured to be connectable to a third internal network different form the first internal network, wherein the first method of transmission and the second method of transmission each correspond to one of a client-server communication method and a peer-to-peer communication method; and
  send second information indicating the second method to the first communication device.

7. The non-transitory computer-readable medium according to claim 6, wherein
the first method includes a peer to peer communication method in a case where it is determined that the first internal network and the second internal network are the same.

8. The non-transitory computer-readable medium according to claim 6, wherein
the second method includes the client-server communication method as the second method in a case where it is determined that the first internal network is different from the second internal network and that the session has been established between the first communication device and the third communication device.

9. The non-transitory computer-readable medium according to claim 6, wherein the instructions, when executed, further cause the communication control device to:
determine a fourth method as a method of communication from the first communication device to the second communication device and of communication from the second communication device to the first communication device in a case where it is determined that the first internal network is different from the second internal network and that the session has not been established between the first communication device and the third communication device, the fourth method being a predetermined method that is one of the peer to peer communication method and the client-server communication method, and
send third information indicating the fourth method to the first communication device and the second communication device.

10. The non-transitory computer-readable medium according to claim 6, wherein the acquiring further comprises:
acquiring, as the first network information, first address information that is associated with a first port of a first relay device, the first relay device including the first port and a second port, the first port being connected to the external network, and the second port being connected to the first internal network; and
acquiring, as the second network information, second address information that is associated with a third port of a second relay device, the second relay device including the third port and a fourth port, the third port being connected to the external network, and the fourth port being connected to the second internal network.

11. A non-transitory computer-readable medium storing computer-readable instructions that, when executed by a processor of a communication device, cause the communication device to:

acquire first network information that identifies a first internal network to which the communication device is connected, and second network information that identifies a second internal network to which another communication device is connected, the first internal network being connected to an external network, and the second internal network being connected to the external network;

determine whether the first internal network and the second internal network are the same, based on the acquired first network information and the second network information;

in a case where the first internal network and the second internal network are the same:
  determine a first method of transmission from a first communication device to a second communication device, and of transmission from the second communication device to the first communication device; and
  notifying first information indicating the first method to the first communication device and the second communication device; and in a case where the first internal network and the second internal network are different:
  determine whether a session has been established between the first communication device and a third communication device;
  determine, based on a result of the determining whether the session has been established between the first and third communication devices, a second method for communication with the other communication device, wherein the first method of transmission and the second method of transmission each correspond to one of a client-server communication method and a peer-to-peer communication method; and notifying second information indicating the second method to the other communication device; and establishing a session with the other communication device based on the information indicating the first method, and performing communication using the first method.

12. The system of claim 1, wherein the second method is different from the first method.

13. The non-transitory computer-readable medium of claim 6, wherein the second method is different from the first method.

14. The non-transitory computer-readable medium of claim 11, wherein the second method is different from the first method.

* * * * *